(12) United States Patent
Graham et al.

(10) Patent No.: US 10,655,761 B2
(45) Date of Patent: May 19, 2020

(54) FACE-SEALING FLUIDIC CONNECTION SYSTEM

(71) Applicant: IDEX Health & Science LLC, Oak Harbor, WA (US)

(72) Inventors: Craig Graham, Anacortes, WA (US); Eric Beemer, Anacortes, WA (US); Scott Ellis, Anacortes, WA (US); Troy Sanders, Oak Harbor, WA (US); Nathaniel Nienhuis, Oak Harbor, WA (US)

(73) Assignee: IDEX Health & Science LLC, Oak Harbor, WA (US)

( * ) Notice: Subject to any disclaimer, the term of this patent is extended or adjusted under 35 U.S.C. 154(b) by 244 days.

(21) Appl. No.: 14/922,041

(22) Filed: Oct. 23, 2015

(65) Prior Publication Data
US 2016/0116088 A1    Apr. 28, 2016

Related U.S. Application Data

(60) Provisional application No. 62/067,739, filed on Oct. 23, 2014, provisional application No. 62/127,276, (Continued)

(51) Int. Cl.
*F16L 15/08* (2006.01)
*F16L 19/02* (2006.01)
(Continued)

(52) U.S. Cl.
CPC .............. *F16L 15/08* (2013.01); *B01D 15/10* (2013.01); *B01L 3/563* (2013.01);
(Continued)

(58) Field of Classification Search
CPC .... F16L 15/08; F16L 19/0206; F16L 19/0212
(Continued)

(56) References Cited

U.S. PATENT DOCUMENTS 3,880,452 A    4/1975 Fields
4,076,286 A    2/1978 Spontelli
(Continued)

FOREIGN PATENT DOCUMENTS

CN    2087340 U    10/1991
DE    4114765 A1    11/1992
(Continued)

OTHER PUBLICATIONS

Notice of Opposition dated Jan. 22, 2015.
(Continued)

*Primary Examiner* — Anna M Momper
*Assistant Examiner* — Fannie C Kee
(74) *Attorney, Agent, or Firm* — Vinson & Elkins L.L.P.

(57) ABSTRACT

A tubing or fitting assembly has an inner tube layer, an outer tube layer, a sleeve, a tip portion, and can have a nut. Each of the nut, sleeve, inner and outer tubing layers, and tip portion have a passageway therethrough, with at least the passageways in the sleeve, tip portion, outer tube layer, and nut adapted to allow the inner tube layer to pass therethrough or extend over the inner layer. The tip portion can be molded over an end portion of the inner tube layer and also over a portion of the sleeve. The sleeve may include a retention feature in the form of a lip which extends into the tip portion, and also a narrower portion so that the tip portion and sleeve remain coupled together. The inner and outer tubing layers can also be retained by an interference fit. The ends of the tip portion and inner layer together define a substantially flat surface which can form a seal in a flat-bottomed port of a component such as may be found in any one of a number of components in an analytical instrument system, including for example a liquid chromatography system. The nut, tube, ferrule, and transfer tube or liner tube may comprise biocompatible materials. In addition, the nut may have a slot,
(Continued)

such as a slot adapted to allow the tube and the nut to be easily and quickly separated or to allow a portion of the tube to be easily and quickly inserted in the nut.

26 Claims, 25 Drawing Sheets

Related U.S. Application Data filed on Mar. 2, 2015, provisional application No. 62/168,491, filed on May 29, 2015.

(51) Int. Cl.
*G01N 30/60* (2006.01)
*B01D 15/10* (2006.01)
*B01L 3/00* (2006.01)

(52) U.S. Cl.
CPC ....... *F16L 19/0206* (2013.01); *F16L 19/0212* (2013.01); *G01N 30/6026* (2013.01); *B01L 2300/0838* (2013.01)

(58) Field of Classification Search
USPC .............................. 285/328, 331, 332, 332.1
See application file for complete search history.

(56) References Cited

U.S. PATENT DOCUMENTS

| | | | |
|---|---|---|---|
| 4,083,702 A | 4/1978 | Hartigan et al. | |
| 4,619,473 A | 10/1986 | Someya | |
| 4,915,427 A | 4/1990 | Zahuranec | |
| 5,169,120 A | 12/1992 | Guthrie, Jr. et al. | |
| 5,306,052 A | 4/1994 | Megushion | |
| 5,578,157 A * | 11/1996 | Higdon | G01N 30/6039 156/278 |
| 5,595,406 A | 1/1997 | Warchol | |
| 5,601,785 A | 2/1997 | Higdon | |
| 5,651,776 A * | 7/1997 | Appling | A61M 39/10 285/332 |
| 5,651,885 A | 7/1997 | Schick | |
| 5,709,413 A | 1/1998 | Salyers | |
| 6,056,331 A | 5/2000 | Benett et al. | |
| 6,273,478 B1 | 8/2001 | Benett et al. | |
| 6,494,500 B1 | 12/2002 | Todosiev et al. | |
| 6,926,313 B1 | 8/2005 | Renzi | |
| 7,014,222 B1 | 3/2006 | Poppe | |
| 7,513,535 B2 | 4/2009 | Charles et al. | |
| 7,909,367 B2 * | 3/2011 | Plant | G01N 30/6034 285/249 |
| 8,006,367 B1 | 8/2011 | Best | |
| 9,091,693 B2 | 7/2015 | Hochgraeber et al. | |
| 9,334,989 B2 | 5/2016 | Jencks et al. | |
| 2002/0101079 A1 | 8/2002 | Ehrke | |
| 2007/0052237 A1 | 3/2007 | Udhofer et al. | |
| 2009/0160133 A1 | 6/2009 | Williams et al. | |
| 2009/0295156 A1 | 12/2009 | Ford et al. | |
| 2011/0006519 A1 | 1/2011 | Weh | |
| 2011/0298210 A1 | 12/2011 | Hochgraeber et al. | |
| 2012/0024411 A1 | 2/2012 | Hahn et al. | |
| 2012/0061955 A1 | 3/2012 | Hochgraeber et al. | |
| 2013/0298647 A1 | 11/2013 | Falk-Jordan | |
| 2013/0341260 A1 | 12/2013 | Dehmer | |
| 2014/0145437 A1 | 5/2014 | Burger et al. | |

FOREIGN PATENT DOCUMENTS

| | | |
|---|---|---|
| DE | 102008059897 A1 | 6/2010 |
| DE | 102009022368 B3 | 11/2010 |
| EP | 0087598 A2 | 9/1983 |
| EP | 2564104 A2 | 3/2013 |
| WO | 91/00470 A1 | 1/1991 |
| WO | 2001073338 A1 | 10/2001 |
| WO | 2006083597 A2 | 8/2006 |
| WO | 2006091952 A1 | 8/2006 |
| WO | 2010000324 A1 | 1/2010 |
| WO | 2010010884 A1 | 1/2010 |
| WO | 2011137452 A2 | 11/2011 |
| WO | 2012177403 A1 | 12/2012 |

OTHER PUBLICATIONS

A. Sonnenschein, H. Knauer, "Dynaseal-Connection System for HPLC", Chromatographia vol. 22, No. 7-12, Dec. 1986.
Dr. Herbert Knauer Wissenschaftliche Gerate KG, "Dynaseal-Verbindungssystem für die HPLC," 1986.
Excerpt from catalog "Scivex 2003, Upchurch Scientific Division: Catalog of Chromatography & Fluid Transfer Components," 2003.
International Search Report dated Mar. 3, 2016.

* cited by examiner

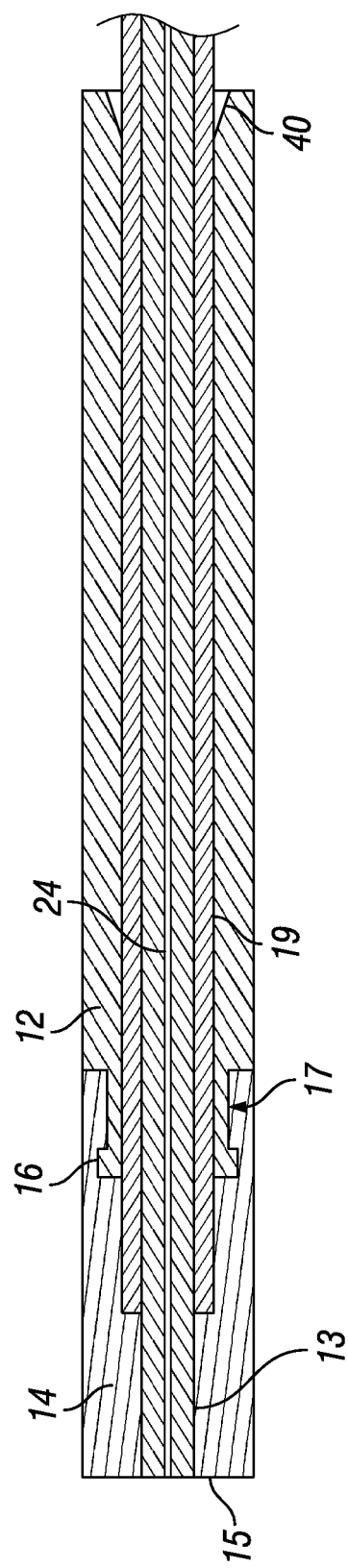

FACE-SEALING FLUIDIC CONNECTION SYSTEM

CROSS-REFERENCE TO RELATED APPLICATIONS

This application claims benefit of priority from U.S. Provisional Patent Application No. 62/067,739, filed Oct. 23, 2014, U.S. Provisional Patent Application No. 62/127,276, filed Mar. 2, 2015, and U.S. Provisional Patent Application No. 62/168,491, filed May 29, 2015, each of which is hereby incorporated by reference herein.

FIELD OF THE INVENTION

The present disclosure relates generally to fitting assemblies and fluidic connection systems, such as those used in connecting components of liquid chromatography systems and other analytical instrument systems, and, more specifically, to fitting assemblies and fluidic connection systems for connecting tubing to ports.

BACKGROUND OF THE INVENTION

Liquid chromatography (LC) is a well-known technique for separating the constituent elements in a given sample. In a conventional LC system, a liquid solvent (referred to as the "mobile phase") is introduced from a reservoir and is pumped through the LC system. The mobile phase exits the pump under pressure. The mobile phase then travels via tubing to a sample injection valve. As the name suggests, the sample injection valve allows an operator to inject a sample into the LC system, where the sample will be carried along with the mobile phase.

In a conventional LC system, the sample and mobile phase pass through one or more filters and often a guard column before coming to the column. A typical column usually consists of a piece of steel tubing which has been packed with a "packing" material. The "packing" consists of the particulate material "packed" inside the column. It usually consists of silica- or polymer-based particles, which are often chemically bonded with a chemical functionality. The packing material is also known as the stationary phase. One of the fundamental principles of separation is the mobile phase continuously passing through the stationary phase. When the sample is carried through the column (along with the mobile phase), the various components (solutes) in the sample migrate through the packing within the column at different rates (i.e., there is differential migration of the solutes). In other words, the various components in a sample will move through the column at different rates. Because of the different rates of movement, the components gradually separate as they move through the column. Differential migration is affected by factors such as the composition of the mobile phase, the composition of the stationary phase (i.e., the material with which the column is "packed"), and the temperature at which the separation takes place. Thus, such factors will influence the separation of the sample's various components.

Once the sample (with its components now separated) leaves the column, it flows with the mobile phase past a detector. The detector detects the presence of specific molecules or compounds. Two general types of detectors are used in LC applications. One type measures a change in some overall physical property of the mobile phase and the sample (such as their refractive index). The other type measures only some property of the sample (such as the absorption of ultraviolet radiation). In essence, a typical detector in a LC system can measure and provide an output in terms of mass per unit of volume (such as grams per milliliter) or mass per unit of time (such as grams per second) of the sample's components. From such an output signal, a "chromatogram" can be provided; the chromatogram can then be used by an operator to determine the chemical components present in the sample.

In addition to the above components, a LC system will often include filters, check valves, a guard column, or the like in order to prevent contamination of the sample or damage to the LC system. For example, an inlet solvent filter may be used to filter out particles from the solvent (or mobile phase) before it reaches the pump. A guard column is often placed before the analytical or preparative column; i.e., the primary column. The purpose of such a guard column is to "guard" the primary column by absorbing unwanted sample components that might otherwise bind irreversibly to the analytical or preparative column.

In practice, various components in an LC system may be connected by an operator to perform a given task. For example, an operator will select an appropriate mobile phase and column, then connect a supply of the selected mobile phase and a selected column to the LC system before operation. In order to be suitable for high performance liquid chromatography (HPLC) applications, each connection must be able to withstand the typical operating pressures of the HPLC system. If the connection is too weak, it may leak. Because the types of solvents that are sometimes used as the mobile phase are often toxic and because it is often expensive to obtain and/or prepare many samples for use, any such connection failure is a serious concern.

It is fairly common for an operator to disconnect a column (or other component) from a LC system and then connect a different column (or other component) in its place after one test has finished and before the next begins. Given the importance of leak-proof connections, especially in HPLC applications, the operator must take time to be sure the connection is sufficient. Replacing a column (or other component) may occur several times in a day. Moreover, the time involved in disconnecting and then connecting a column (or other component) is unproductive because the LC system is not in use and the operator is engaged in plumbing the system instead of preparing samples or other more productive activities. Hence, the replacement of a column in a conventional LC system involves a great deal of wasted time and inefficiencies.

Given concerns about the need for leak-free connections, conventional connections have been made with stainless steel tubing and stainless steel end fittings. More recently, however, it has been realized that the use of stainless steel components in a LC system have potential drawbacks in situations involving biological samples. For example, the components in a sample may attach themselves to the wall of stainless steel tubing. This presents problems because the detector's measurements (and thus the chromatogram) of a given sample may not accurately reflect the sample if some of the sample's components or ions remain in the tubing, and do not pass the detector. Perhaps of even greater concern, however, is the fact that ions from the stainless steel tubing may detach from the tubing and flow past the detector, thus leading to potentially erroneous results. Additionally, ions can easily bind to biological compounds of interest, resulting in changes to the molecules that affect their retention time in the column. Hence, there is a need for "biocompatible" connections through the use of a material that is chemically inert with respect to such "biological" samples and the mobile phase used with such samples so that ions will not be released by the tubing and thus contaminate the sample.

In many applications using selector/injector valves to direct fluid flows, and in particular in liquid and gas chromatography, the volume of fluids is small. This is particularly true when liquid or gas chromatography is being used as an analytical method as opposed to a preparative method. Such methods often use capillary columns and are generally referred to as capillary chromatography. In capillary chromatography, both gas phase and liquid phase, it is often desired to minimize the internal volume of the selector or injector valve. One reason for this is that a valve having a large volume will contain a relatively large volume of liquid, and when a sample is injected into the valve the sample will be diluted, decreasing the resolution and sensitivity of the analytical method.

Micro-fluidic analytical processes also involve small sample sizes. As used herein, sample volumes considered to involve micro-fluidic techniques can range from as low as volumes of only several picoliters or so, up to volumes of several milliliters or so, whereas more traditional LC techniques, for example, historically often involved samples of about one microliter to about 100 milliliters in volume. Thus, the micro-fluidic techniques described herein involve volumes one or more orders of magnitude smaller in size than traditional LC techniques. Micro-fluidic techniques can also be expressed as those involving fluid flow rates of about 0.5 ml/minute or less.

Most conventional HPLC systems include pumps which can generate relatively high pressures of up to around 5,000 psi to 6,000 psi or so. In many situations, an operator can obtain successful results by operating a LC system at "low" pressures of anywhere from just a few psi or so up to 1,000 psi or so. More often than not, however, an operator will find it desirable to operate a LC system at relatively "higher" pressures of over 1,000 psi.

Another, relatively newer liquid chromatography form is Ultra High Performance Liquid Chromatography (UHPLC) in which system pressure extends upward to about 1400 bar or 20,000 psi or so, or even more. In order to achieve greater chromatographic resolution and higher sample throughput, the particle size of the stationary phase has become extremely small. A stationary phase particle as small as 1 micron is common; the resulting high column packing density leads to substantially increased system pressure at the head of the column. Both HPLC and UHPLC are examples of analytical instrumentation that utilize fluid transfer at elevated pressures. For example, in U.S. Patent Publication No. 2007/0283746 A1, published on Dec. 13, 2007 and titled "Sample Injector System for Liquid Chromatography," an injection system is described for use with UHPLC applications, which are said to involve pressures in the range from 20,000 psi to 120,000 psi. In U.S. Pat. No. 7,311,502, issued on Dec. 25, 2007 to Gerhardt, et al., and titled "Method for Using a Hydraulic Amplifier Pump in Ultrahigh Pressure Liquid Chromatography," the use of a hydraulic amplifier is described for use in UHPLC systems involving pressures in excess of 25,000 psi. In U.S. Patent Publication No. 2005/0269264 A1, published on Dec. 8, 2005 and titled "Chromatography System with Gradient Storage and Method for Operating the Same," a system for performing UHPLC is disclosed, with UHPLC described as involving pressures above 5,000 psi (and up to 60,000 psi). Applicants hereby incorporate by reference as if fully set forth herein U.S. Pat. No. 7,311,502 and US Patent Publications Nos. 2007/0283746 A1 and 2005/0269264 A1.

As noted, liquid chromatography (as well as other analytical) systems, including HPLC or UHPLC systems, typically include several components. For example, such a system may include a pump; an injection valve or autosampler for injecting the analyte; a precolumn filter to remove particulate matter in the analyte solution that might clog the column; a packed bed to retain irreversibly adsorbed chemical material; the HPLC column itself; and a detector that analyzes the carrier fluid as it leaves the column. These various components may typically be connected by a miniature fluid conduit, or tubing, such as metallic or polymeric tubing, usually having an internal diameter of 0.001 to 0.040 inch.

All of these various components and lengths of tubing are typically interconnected by threaded fittings. Fittings for connecting various LC system components and lengths of tubing are disclosed in prior patents, for example, U.S. Pat. Nos. 5,525,303; 5,730,943; and 6,095,572, the disclosures of which are herein all incorporated by reference as if fully set forth herein. Often, a first internally threaded fitting seals to a first component with a ferrule or similar sealing device. The first fitting is threadedly connected through multiple turns by hand or by use of a wrench or wrenches to a second fitting having a corresponding external fitting, which is in turn sealed to a second component by a ferrule or other seal. Disconnecting these fittings for component replacement, maintenance, or reconfiguration often requires the use of a wrench or wrenches to unthread the fittings. Although a wrench or wrenches may be used, other tools such as pliers or other gripping and holding tools are sometimes used. It will be understood by those skilled in the art that, as used herein, the term "LC system" is intended in its broad sense to include all apparatus and components in a system used in connection with liquid chromatography, whether made of only a few simple components or made of numerous, sophisticated components which are computer controlled or the like. Those skilled in the art will also appreciate that an LC system is one type of an analytical instrument (AI) system. For example, gas chromatography is similar in many respects to liquid chromatography, but obviously involves a gas sample to be analyzed. Such analytical instrument systems include high performance or high pressure liquid chromatography systems, an ultra high performance or ultra high pressure liquid chromatography system, a mass spectrometry system, a microflow chromatography system, a nanoflow chromatography system, a nano-scale chromatography system, a capillary electrophoresis system, a reverse-phase gradient chromatography system, or a combination thereof. Although the following discussion focuses on liquid chromatography, those skilled in the art will appreciate that much of what is said also has application to other types of AI systems and methods.

Increasing pressure requirements in liquid chromatography have necessitated the use of high pressure fluidic components. For many applications regular stainless steel tubing can be used to withstand the high pressure. However, for some types of analyses (e.g., biological testing and metal/ion analysis), stainless steel or other metals are not desired in the fluid path as the metal could interfere with the testing. Additionally, there are some fields of use (e.g., nano-scale or nano-volume analysis), that require very small inside diameters to accommodate the extremely low volumes required by these applications. Such small inside diameters are typically not available in stainless steel or other high pressure tubing.

In high-performance liquid chromatography (HPLC), ultra high-performance liquid chromatography (UHPLC), and other high-pressure analytic chemistry applications, various system components and their fluidic connections must be able to withstand pressures of 15,000 to 20,000 psi or so. The types of fluidic connection systems between the tubes that carry fluids and the ports that receive fluids in these high-pressure applications are limited. Many fluidic connection systems rely on cone-shaped, threaded, or welded fittings to attach a tube to a receiving port. These types of connections sometimes may have drawbacks, however. For example, the size of cone-shaped fittings and threaded fittings are dependent on the type and size of any given port, which makes quickly interchanging a tube fitted with a particular cone or threaded fitting between various ports difficult. Other compression-based fittings have been employed to address this problem. Such fittings often employ a ferrule or a lock ring to help secure one end of a tube to a receiving port. However, ferrules and lock rings can become deformed after multiple uses (e.g., by connecting, disconnecting, and reconnecting to various ports). This is especially true in high-pressure applications, where a fluid-tight seal is essential, and where a ferrule or lock ring may be more likely to become deformed in creating such a seal.

For example, published U.S. Patent Application No. 2013/0043677, titled "Tube and Pipe End Cartridge Seal," published on Feb. 21, 2013, describes a tube and pipe end cartridge seal for use at high pressures, which relies on a fitting body (including ferrule fittings) to effectuate a seal with the axial end of a tube. Moreover, a dimple is forged on the annular end of the tube face to further effectuate the seal. Likewise, U.S. Pat. No. 6,056,331, titled "Zero Dead Volume Tube to Surface Seal," issued to Bennett et al. on May 2, 2000, describes an apparatus for connecting a tube to a surface using a body, a ferrule, and a threaded fitting. Although Bennett et al. discloses a type of tube face-sealing apparatus, the apparatus of Bennet et al. relies on a threaded fitting and a ferrule. Similarly, published U.S. Patent Application No. 2012/0061955, titled "Plug Unite and Connection System for Connecting Capillary Tubes, Especially for High-Performance Liquid Chromatography," published on Mar. 15, 2012, discloses a plug unit connection system for capillary tubes, wherein a seal is provided at the interface between a capillary tube and a bushing unit, instead of at the location of a ferrule or conical fitting. However, U.S. Patent Application No. 2012/0061955 relies on the use of a pressure piece similar to a ferrule to ensure that enough axial force can be generated to obtain a seal at the tube face.

Connection assemblies which attempt to effectuate a seal for high-pressure applications can require a significant amount of torque to effectuate a fluid-tight seal, making the creation of such seals difficult without the use of additional tools and increasing the risk of damage to the fitting assembly or its components due to overtightening. Moreover, experience suggests that many users do not like to use various tools to connect or disconnect tubing from components such as those in various AI systems. It is believed that users often apply different amounts of torque to connect or disconnect tubing and the components in such systems, thus resulting in potential problems caused by over-tightening or under-tightening (e.g., leakage or loss of sealing when the fluid is under pressure).

One example of a flat-bottomed or face-sealing connection assembly is provided by U.S. Pat. No. 8,696,038, titled "Flat Bottom Fitting Assembly" and issued on Apr. 15, 2014 to Nienhuis. Nienhuis teaches a type of flat bottom assembly which includes a flat-sided ferrule, and wherein the assembly including the ferrule and the tube can be pressed against a flat bottom port. Another example of a flat-bottomed or face-sealing connection assembly is provided by published U.S. Patent Application No. 2012/0024411, titled "Biocompatible Tubing for Liquid Chromatography Systems," which was published on Feb. 2, 2012 and was filed on behalf of Hahn et al. The Hahn et al. published patent application describes tubing having an inner layer and an outer layer, and in which the inner layer can be biocompatible material such as polyetheretherketone (PEEK) and the outer layer may be a different material, and in which an end of the tubing may be flared or otherwise adapted to have a larger outer diameter than other portions of the tubing. The current state of the art for high pressure connections in both HPLC and UHPLC is to utilize coned ports along with some form of ferrule and nut combination with tubing. The nut translates rotational torque into axial load that is translated to the ferrule. The load causes the ferrule to deform/deflect and grip the tubing, creating a seal. The tube is typically forced into the bottom of the coned port, but there is not currently a mechanism to ensure there is not a gap or space at the port bottom.

The space at the bottom of the port is a concern for those performing liquid chromatography experiments due to the potential to negatively influence the results with carry over and band broadening. Carry over is just as it sounds, analyte from one test is carried over to the next. Carry over can produce very unstable results for obvious reasons. Band broadening is when the peaks identifying a substance become less symmetric and make identification more difficult when peaks of different molecules have similar retention times.

One issue with conventional ferrules used with coned ports is that the torque required to deform/deflect is typically above finger tight levels in order to achieve UHPLC pressures (e.g., above 12,000 psi or so). It is desirable to remove tools from the lab by making them unnecessary for making and breaking fluidic connections and it is advantageous to have fittings that can be connected simply with the fingers rather than tools.

European Patent No. EP 2564104 describes a sealing system for use at high pressure. End-face seals minimize the sealing radius and therefore allow various fittings—including known ferrule fittings—to be used in high-pressure systems. End-face seals at such high pressure may require smooth surfaces, however. In order to reduce cost, an end-face preparation tool may be required to forge a dimple into the end face to mechanically deform and smooth the surface.

U.S. Pat. No. 6,056,331 describes an apparatus that is composed of three components, a body, a ferrule, and a threaded fitting. The ferrule is compressed onto a tube and a seal is formed between the tube and a device retained in the body by threading the fitting into the body which provides pressure that seals the face of the ferrule to a mating surface on the device. This seal may be used at elevated temperatures, depending on the materials used. This fitting was developed for use with micro-machined silicon wafers used in capillary gas chromatography.

U.S. Pat. Nos. 5,525,303, 5,730,943, 6,056,0331, 6,095, 572, 6,056,331, 7,311,502, 8,696,038, European Patent No. EP2564104, and published U.S. Patent Application Nos. 2005/0269264, 2007/0283746, 2012/0024411, 2012/0061955, and 2013/0043677 are hereby incorporated by reference as if fully set forth herein.

SUMMARY OF THE INVENTION

It is therefore an object of the present disclosure to provide a fluidic connection system useful for high-pressure applications. The system can provide a sealing connection without the use of additional parts such as ferrules, locking rings, or other fittings. It is a further object of the present disclosure to provide a fluidic connection system, wherein the axial force necessary to create an effective seal for high-pressure applications can be generated manually, with minimal torque and without the use of tools. It is a further object of the present disclosure to provide a fluidic connection system which is flexible and can be quickly and easily connected and disconnected with various tubes and ports without damaging the connection system.

In one embodiment of the present disclosure, a fitting assembly comprises a nut having a passageway extending therethrough and having a first end and a second end, wherein said nut has an externally threaded portion near the second end of said nut, a tube having a portion extending through the passageway in said nut, wherein said tube comprises an inner layer and an outer layer, each having a first end and a second end and each layer having an inside diameter and an outside diameter, wherein the outer layer of said tube has an inside diameter greater than the outside diameter of the inner layer, and wherein the first end of said tube comprises a tip portion, wherein the tip portion has an inner diameter and an outer diameter and a portion of the inner layer of said tube is located within the inner diameter of the tip portion, and wherein at least one of a first end of the tip portion and the first end of the inner layer define a surface adapted to form a seal with a port, and a sleeve having a passageway therethrough and having a first end and a second end, with at least a portion of the first end of said sleeve adapted to fit against a surface of said nut and at least a portion of the second end of said sleeve located between the outside diameter of a portion of the inner layer of said tube and the inner diameter of the tip portion of said tube, wherein the tip portion of said tube extends over at least a portion of the inner layer of said tube, at least a portion of the outer layer of said tube, and over at least a portion of the sleeve. The outer layer of said tube may comprise a first material and the inner layer of said tube may comprise a second material, and the two materials may be different. In the fitting assembly, the first material may comprise a material different than the second material. The sleeve and the outer tube layer may each comprise a metal material, and the inner layer of said tube and the tip of said tube may comprise a biocompatible material, such as polyetheretherketone (PEEK). In addition, the sleeve may further comprise a retention feature, such as a lip. The tip of the tube may be overmolded over and onto a portion of the inner tube layer.

In another embodiment of the present disclosure, a tubing assembly is provided, which comprises a tube having an inner layer and an outer layer, each having a first end and a second end and each having an inside diameter and an outside diameter, wherein said tube further comprises a tip portion having a first end, and wherein at least one of a first end of the inner layer of said tube and the first end of the tip portion of said tube defines a substantially flat surface adapted to contact and form a seal against a flat-bottomed port, and a sleeve having a passageway therethrough and having a first end and a second end, with at least a first portion of said sleeve located between the outside diameter of a portion of the outer layer of said tube and a second portion of said sleeve located between the inner diameter of a portion of the tip portion of said tube and the outside diameter of the inner layer of said tube. In such a tubing assembly, the sleeve may comprise a metal such as stainless steel, the inner layer of said tube may comprise a biocompatible material such as PEEK, the outer layer of said tube may comprise a material such as stainless steel, and the tip portion of said tube may comprises a biocompatible material, such as PEEK.

In another embodiment, an analytical instrument system is provided which comprises at least two components having fluid communication therebetween, wherein at least one of said components has a flat-bottomed port having a face, a tube comprising an inner layer and an outer layer, each having a first end and a second end and each having an inside diameter and an outside diameter, said tube further comprising a tip portion, wherein a first end of the tip portion of said tube defines a substantially flat surface, and wherein the tip portion of said tube has a greater outside diameter than the outside diameter of the inner layer, a sleeve having a passageway therethrough and having a first end and a second end, with at least a portion of the first end of said sleeve located between the outside diameter of a portion of the inner layer of said tube and the inner diameter of a portion of the tip portion of said tube, wherein the tip portion of said tube extends over at least a portion of the inner layer and over at least a portion of the sleeve, wherein the first end of the tip portion and the face of the flat-bottomed port are in a sealing engagement, and wherein either or both of said components comprise any one of the following: pumps, columns, filters, guard columns, injection valves, and other valves, detectors, pressure regulators, reservoirs, degassers, unions, tees, crosses, adapters, splitters, sample loops, and/or connectors. Both the inner layer and the tip portion of said tube may comprise a biocompatible material, such as PEEK.

In another embodiment, a fitting assembly is provided in which a nut has one or more slots, which can extend the longitudinal length of the nut and which can extend radially from the passageway through the nut to the exterior of the nut. The nut can have one or more such slots, and the slots can extend along only a portion of the longitudinal length of the nut if desired. In addition, the slot can be adapted so that tubing can be easily inserted into the interior passageway of the nut by an operator, or can be easily removed from the nut by an operator. The slot is adapted so that a tube or a portion of a tube can be easily inserted into or removed from the nut through the slot.

Each of the fitting assembly, tubing assembly, and analytical instrument system of the present disclosure are adapted to provide at least one sealing connection for a fluid connection in which the fluid has a pressure of between 0 psi and 25,000 psi, between 1,000 psi and 20,000 psi, and/or between 2,500 psi and 10,000 psi. Such a sealing connection can be made by a user without the use of tools or ferrules, and is adapted so that it can be made with a flat-bottomed port.

These and numerous other features, objects and advantages of the present disclosure will become readily apparent to those skilled in the art upon a reading of the detailed description, claims and the drawings.

BRIEF DESCRIPTION OF THE DRAWINGS

FIG. 5 is a detailed cross-sectional view of a portion of the tubing of the fitting assembly in one embodiment.

DETAILED DESCRIPTION

Figure 1:
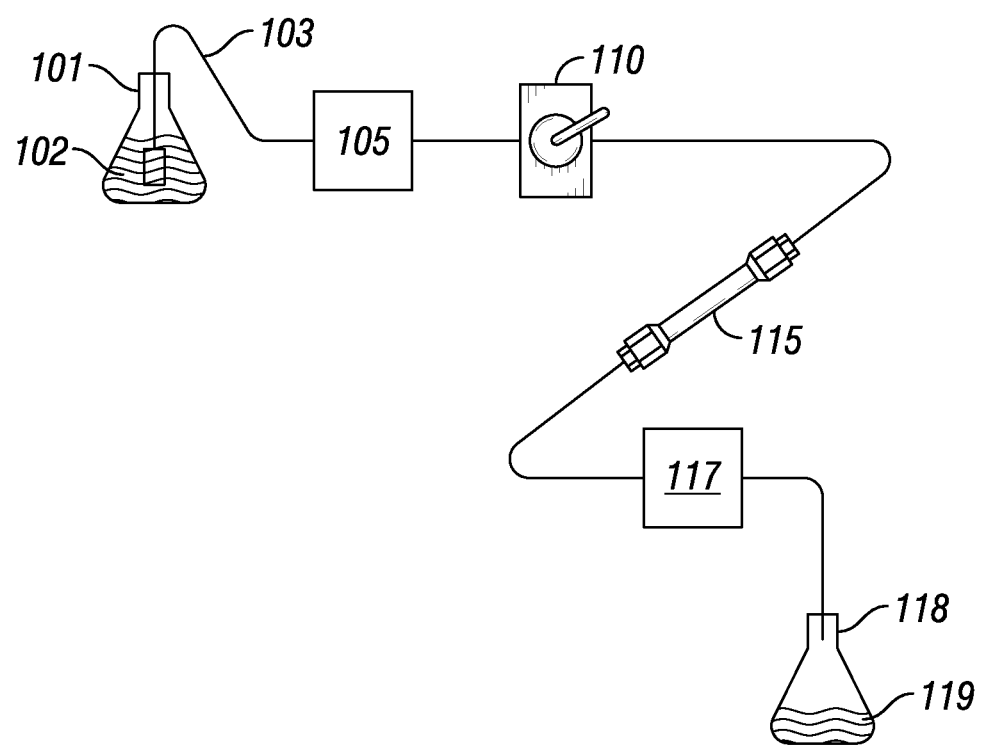
FIG. 1 is a block diagram of a conventional liquid chromatography system.

In FIG. 1, a block diagram of the essential elements of a conventional liquid chromatography (LC) system is provided. A reservoir 101 contains a solvent or mobile phase 102. Tubing 103 connects the mobile phase 102 in the reservoir 101 to a pump 105. The pump 105 is connected to a sample injection valve 110 which, in turn, is connected via tubing to a first end of a guard column (not shown). The second end of the guard column (not shown) is in turn connected to the first end of a primary column 115. The second end of the primary column 115 is then connected via tubing to a detector 117. After passing through the detector 117, the mobile phase 102 and the sample injected via injection valve 110 are expended into a second reservoir 118, which contains the chemical waste 119. As noted above, the sample injection valve 110 is used to inject a sample of a material to be studied into the LC system. The mobile phase 102 flows through the tubing 103 which is used to connect the various elements of the LC system together.

When the sample is injected via sample injection valve 110 in the LC system, the sample is carried by the mobile phase through the tubing into the column 115. As is well known in the art, the column 115 contains a packing material which acts to separate the constituent elements of the sample. After exiting the column 115, the sample (as separated via the column 115) then is carried to and enters a detector 117, which detects the presence or absence of various chemicals. The information obtained by the detector 117 can then be stored and used by an operator of the LC system to determine the constituent elements of the sample injected into the LC system. Those skilled in the art will appreciate that FIG. 1 and the foregoing discussion provide only a brief overview of a simplistic LC system that is conventional and well known in the art, as is shown and described in U.S. Pat. No. 5,472,598, issued Dec. 5, 1995 to Schick, which is hereby incorporated by reference as if fully set forth herein. Those skilled in the art will also appreciate that while the discussion herein focuses on a LC system, other analytical systems can be used in connection with various embodiments of the invention, such as a mass spectrometry, microflow chromatography, nanoflow chromatography, nano-scale liquid chromatography, capillary electrophoresis, or reverse-phase gradient chromatography system.

Preferably, for an LC system to be biocompatible, the various components (except where otherwise noted) that may come into contact with the effluent or sample to be analyzed are made of the synthetic polymer polyetheretherketone, which is commercially available under the trademark "PEEK" from Victrex. The polymer PEEK has the advantage of providing a high degree of chemical inertness and therefore biocompatibility; it is chemically inert to most of the common solvents used in LC applications, such as acetone, acetonitrile, and methanol (to name a few). PEEK also can be machined by standard machining techniques to provide smooth surfaces. Those skilled in the art will appreciate that other polymers may be desirable in certain applications.

Figure 2:
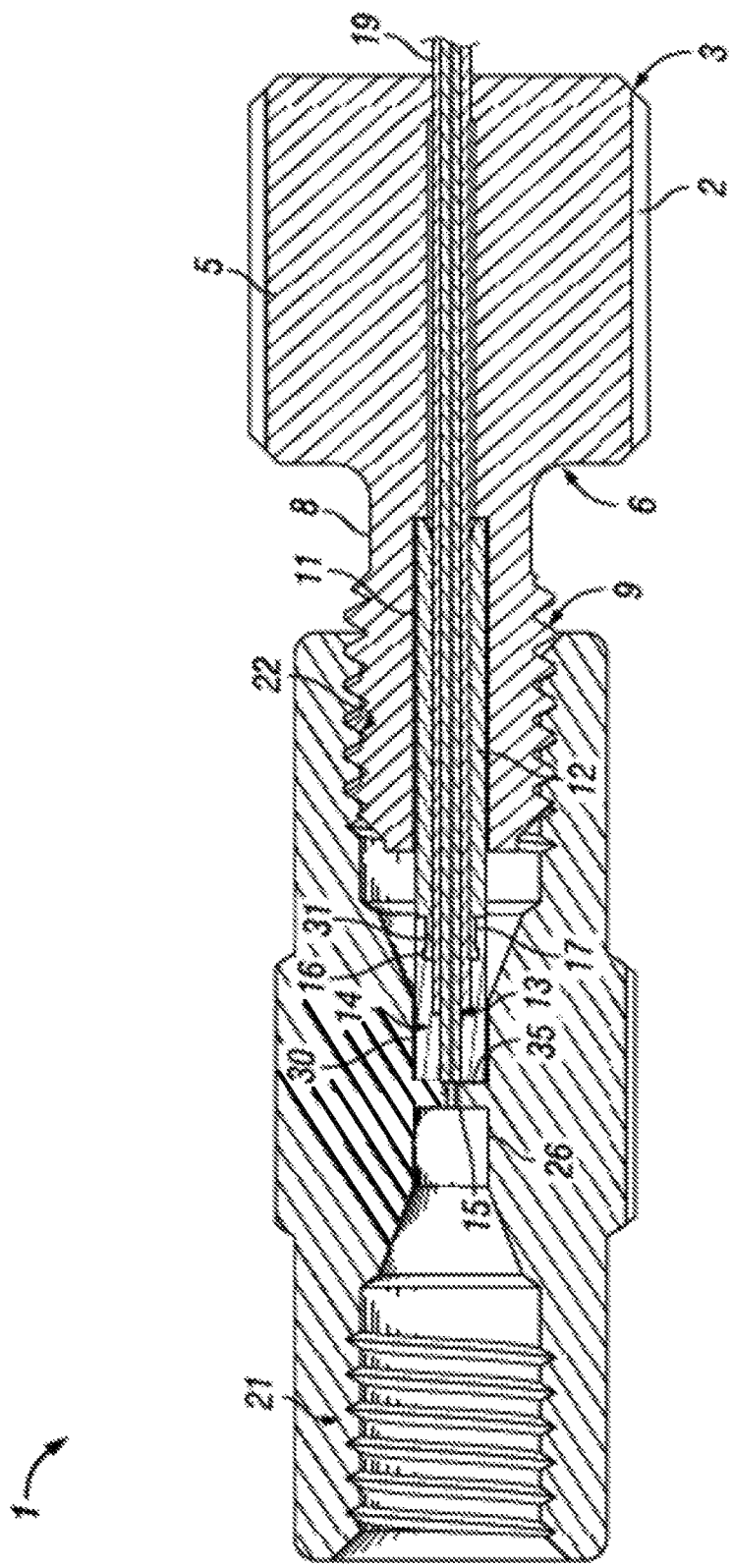
FIG. 2 is a detailed cross-sectional view of one embodiment of the fluidic connection system.

Referring now to FIG. 2, a detailed cross-sectional view of one embodiment of a fitting assembly for a fluidic connection system 1 is shown. Fluidic connection system 1 includes an actuator nut 2. Actuator nut 2 includes a first portion 6 proximate to the end 5 of the head of nut 2, and a non-tapered portion 8 proximate to the first portion 6. The actuator nut 2 also includes an externally threaded portion 9 having threads in a shape which corresponds to the shape of a first internally threaded portion 22 of a housing body 21. As shown in FIG. 2, housing body 21 comprises a union, but those skilled in the art will appreciate that instead of a union, the housing body 21 could be any one of a wide variety of components in an LC, HPLC, UHPLC, or other AI system, including for example, any of the following: pumps, columns, filters, guard columns, injection valves and other valves, detectors, pressure regulators, reservoirs, and other fittings, such as unions, tees, crosses, adapters, splitters, sample loops, connectors, and the like.

As shown in FIG. 2, said externally threaded portion 9 of said actuator nut 2 is rotatably engaged with the internally threaded portion 22 of said housing body 21, thereby removably connecting said nut 2 to the housing body 21. The rotatable engagement of said externally threaded portion 9 of said nut 2 with the internally threaded portion 22 of said housing body 21 removably secures said actuator nut 2 to said housing body 21. (By turning the head portion of nut 2 in the opposite direction, a user can also disconnect the nut 2 from the housing body 21.) When connected (as shown in FIG. 2), axial force on the tube end face 15 is provided when the actuator nut 2 is rotated. As shown in FIG. 2, the rotation of nut 2 relative to body 21 results in the externally threaded portion of nut 2 extending further into the port of body 21, until the port end face 35 and tube end face 15 touch. The force exerted on the tube end face 15 by rotating said actuator nut 2 forms a seal at the interface of the tube end face 15 and the port end face 35.

Tube end face 15 is defined by an end face of an inner tube layer 13 and an end face of an outer tube tip 14. The outer tip 14, sometimes referred to herein as the tube tip 14 or as tip 14, has a first end 30 and a second end 31, with said tube end face 15 being proximate to the first end 30. Between said first end 30 and said second end 31, tube tip 14 surrounds an inner layer 13 of the tube. In one embodiment, tube tip 14 is secured to a sleeve 12 of the tubing assembly by a retainer feature 16, which can be a feature or combination of features of a sleeve 12. Proximate to the second end 31 of said overmolded tube tip 14, a sleeve 12 surrounds the inner tubing layer 13. In one embodiment, sleeve 12 surrounds said inner tubing layer 13 between the second end 31 of said tube tip 14 and the first end 3 of said actuator nut 2. As shown in FIG. 2, sleeve 12 and inner tubing layer 13 extend and pass through a passageway through the axial length of the actuator nut 2, between the externally threaded portion 9 by means of a passageway 11.

The use of an internally threaded portion 22 on said housing body 21 is a matter of choice. Those skilled in the art will therefore appreciate that, in an alternative embodiment, the nut 2 could have an internally threaded portion (not shown) and the housing body 21 could have an externally threaded portion (not shown).

Figure 3:
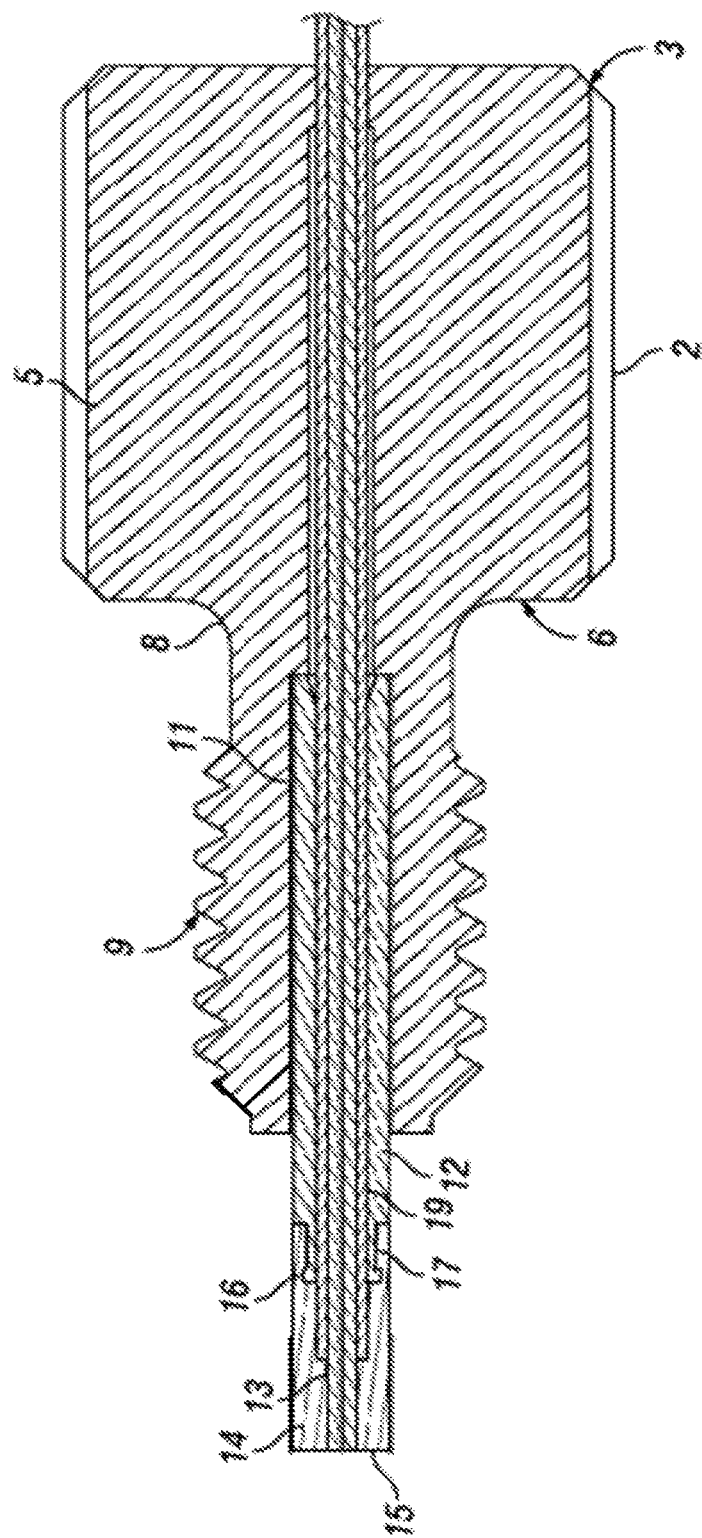
FIG. 3 is an cross-sectional view of one embodiment of a fitting assembly of the fluidic connection system.

Although not shown in FIG. 2, the tubing inner layer 13 preferably has an outer layer surrounding at least a portion thereof. Referring now to FIG. 3, a tubing outer layer 19 can be seen. As shown in FIG. 3, the outer layer 19 is located outside and around the inner tubing layer 13. In addition, a portion of the outer tubing layer 19 is located inside the sleeve 12, and an end portion of the outer tubing layer 19 extends beyond an end of the sleeve 12 and is located inside the overmolded tube tip 14. As also shown in FIG. 3, a portion of the inner layer 13 extends beyond the end of the outer layer 19 in this embodiment. In one particular embodiment, the sleeve 12 and outer tubing layer 19 can be secured to each other, such as by welding, adhesives, or by resin epoxies or other plastics, which can be located between the outside diameter of the outer layer 13 and the inner diameter of the sleeve 12. Securing the outer tubing layer 19 and the sleeve 12 helps prevent rotation of either independent of the other.

It will be appreciated that the tubing layer 13 can comprise a number of different materials depending on the particular application, as that may involve a particular type of sample, a particular type of solvent, and/or a particular pressure range. For example, the outer layer 19 of tube can comprise a metal, such as stainless steel (such as 316 stainless steel) or titanium, or a reinforced polymeric material, including composite or braided materials, such as polymeric materials that are reinforced or braided with carbon, carbon fibers, steel fibers, or the like. In embodiments comprising a metallic outer layer 19, the metal temper can be varied to provide a balance between high pressure capability and tubing flexibility. The inner layer 13 can comprise a biocompatible polymer, such as polyetheretherketone (PEEK). Other polymer materials which may be used for the inner layer 13 include, but are not limited to, TEFLON®, TEFZEL®, DELRIN®, perfluoroalkoxy (PFA, also called perfluoroalkoxyethylene), fluorinated ethylene propylene (PEP), polytetrafluoroethylene (PETE), ETFE (a polymer of tetrafluoroethylene and ethylene), polyetherimide (PEI), polyphenylene sulfide (PPS), polypropylene, sulfone polymers, polyolefins, polyimides, other polyaryletherketones, other fluoropolymers, polyoxymethylene (POM), and others, depending on the foregoing factors or perhaps others. In addition, PEEK (or other polymers) may be used that is reinforced or braided with carbon, carbon fibers, steel fibers, or the like. Furthermore, in certain embodiments the inner layer 13 may be coated with a material to increase strength, improve chemical resistance, improve temperature stability, or reduce permeability. Such coatings include, but are not limited to, metallization, polymeric coating, silicon-based coatings, and carbon-based coatings. Additionally, in certain embodiments the inner layer may be heat treated to improve properties such as crystallinity, chemical resistance, or permeability. Those skilled in the art will appreciate that, although shown and described herein as a single layer, the inner layer 13 of the tube may actually comprise two or more layers if desired. The final tube may be treated to further improve the performance, including heat treatment or annealing to strengthen the polymer components, or pressurizing, with or without added heat, to allow the inner layer to conform to the outer layer. A mandrel can be used in the inner diameter of the inner layer to preserve the passageway.

Actuator nut 2, inner tubing layer 13, sleeve 12, and retainer feature 16 may be embodied in a variety of configurations. Turning now to FIG. 3, overmolded tube tip 14 is secured to the sleeve 12 by retainer feature 16. The same numerals are used throughout the Figures as appropriate to identify the same features for convenient reference. As shown in FIG. 3, the retainer feature 16 has a protrusion which extends away from the inner layer 13 of the tube and towards the outer diameter of outer layer 14. The retainer feature 16 extends into a portion of the overmolded tube tip 14. Retainer feature 16 prevents the overmolded tube tip 14 from disengaging from the sleeve 12 and inner tubing layer 13. Retainer feature 16 also helps prevent the overmolded tube tip 14 from slipping while radial torque is being applied to the actuator nut 2 and axial force is being applied to the tube end face 15. Those skilled in the art will also appreciate that the retainer feature 16 may be of different configurations. For example, more than one retainer feature 16 may be used (not shown). Alternatively, the retainer feature 16 may be of a different shape or size than suggested by FIG. 3. Alternatively, the retainer feature 16 may be substituted by alternate means of securing the overmolded tube tip 14 to the sleeve 12, such as by means of an adhesive or by means of welding the overmolded tube tip 14 to the sleeve 12.

Figure 4:
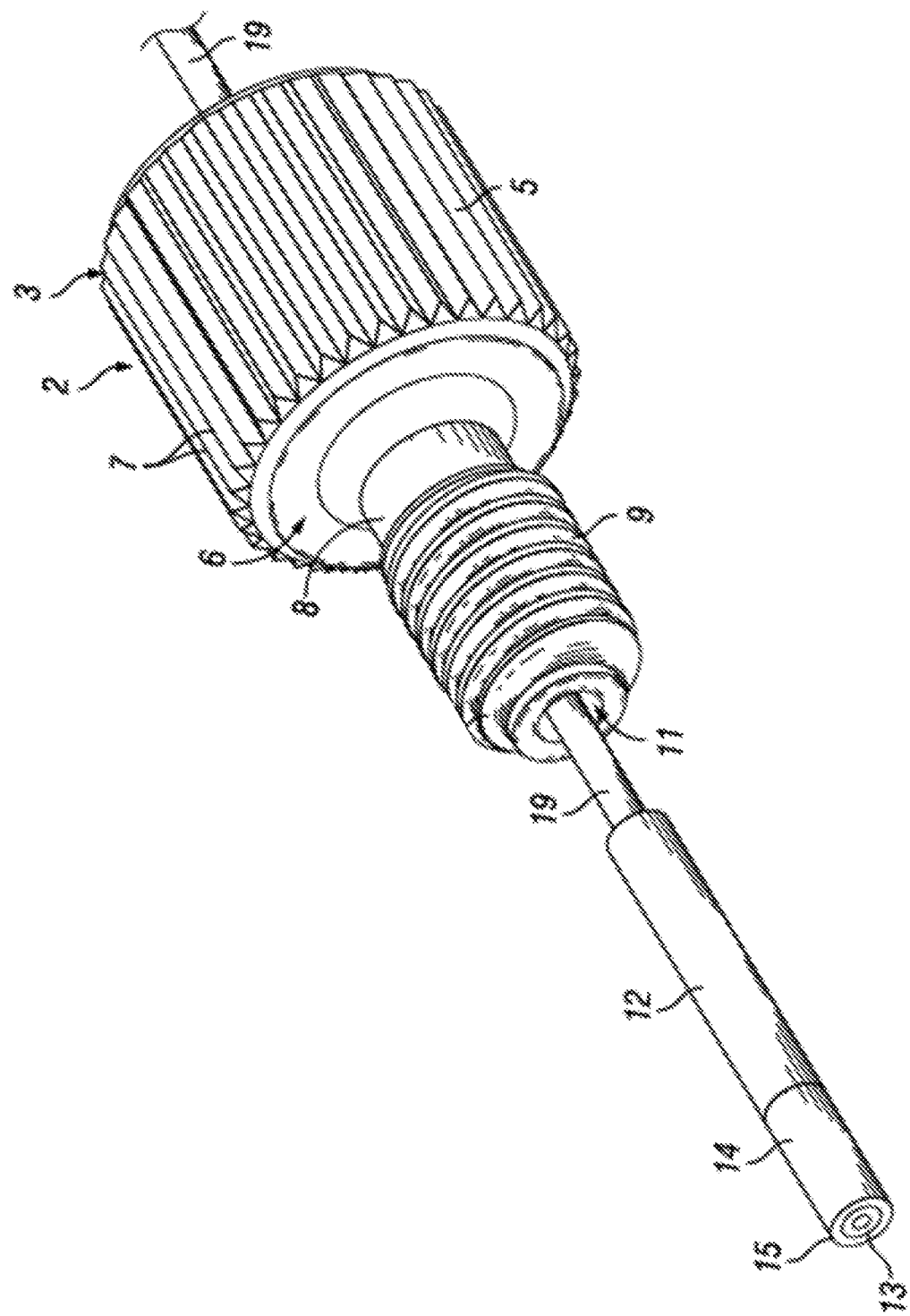
FIG. 4 is an isometric exterior view of the fitting assembly shown in FIG. 2.

Referring now to FIG. 4, another view of the fitting assembly is shown. As shown in FIG. 4, actuator nut 2 preferably has a circular shape, and the exterior surface of the head portion of said actuator nut 2 has a plurality of splines 7 spaced around the head of the nut 2. While those skilled in the art will appreciate the advantages of a circular-shaped actuator nut 2, those skilled in the art will also appreciate that the actuator nut 2, and/or the head of the nut 2, may have a non-circular shape, such as a box shape (not shown), a hexagonal shape (not shown), or other shapes. In addition, those skilled in the art will appreciate that the exterior surface of the actuator nut 2 may be flat (not shown) or cross-hatched (not shown), instead of characterized by splines 7. A variety of actuator nut 2 shapes and exterior surfaces may be used such that said actuator nut 2 may be easily gripped and manually rotated by an operator.

As shown in FIG. 4, the sleeve 12, inner tubing layer 13, and outer tubing layer 19 can be adapted to fit at least partially into a passageway 11. Inner and outer tubing 13 and 19, respectively, exit the actuator nut 2 through a hole (not shown) in the head 5 of the nut 2 proximate to the first end 3 of the actuator nut 2. Inner tubing layer 13 is preferably comprised of a biocompatible material such as synthetic polymer polyetheretherketone, which is commercially available under the trademark PEEK™ from VICTREX®. The outer layer 19 is preferably metal, such as stainless steel. Overmolded tube tip 14 can also comprise PEEK™ in this particular embodiment. Those skilled in the art will appreciate that inner tubing layer 13 and said overmolded tube tip 14 may be comprised of other polymer materials, including for example TEFLON®, TEFZEL®, DELRIN®, perfluoroalkoxyethylene (PF A), polytetrafluoroethylene (PETE), polyetherimide (PEI), polyphenylene sulfide (PPS), polypropylene, polyolefins, polyimides, or polyoxymethylene (POM). Either or both inner tubing layer 13 and overmolded tube tip 14 may alternatively be comprised of carbon-fiber or steel-fiber materials that are interwoven with polymer materials, such as carbon-fiber PEEK™. Either or both inner tubing layer 13 and overmolded tube tip layer 14 may alternatively be comprised of a nano-composite material.

In one embodiment, actuator nut 2 is comprised of a metal, such as, for example, stainless steel. Those skilled in the art will appreciate that the actuator nut 2 may be comprised of other materials such as titanium, fused silica, or a reinforced rigid polymer material (e.g., a carbon-fiber PEEK™ or other metal-braided polymer material). More rigid polymer materials may be more desirable in some applications, since stainless steel has some drawbacks in biological environments. For example, components in a biological fluid can attach to stainless steel, and stainless steel ions may leak into said fluid—both events having the potential to obscure measurements in liquid chromatography and other analytic chemistry applications.

FIG. 5 provides an enlarged view of the cross-section of the combination of the inner layer 13 of the tube, the outer layer 19 of the tubing, and the sleeve 12. In this embodiment, a passageway 24 extends along the longitudinal axis of the inner tubing layer 13 (and also outer tubing layer 19). A fluid or gas may be run through said passageway 24. In this embodiment, the tube has an end face or surface 15 which is substantially flat. However, those skilled in the art will appreciate the tube end face 15 may have other shapes, such as a rounded or dimpled surface (not shown). A flat or substantially flat surface 15 is believed to be sufficient for purposes of creating an effective seal with the port end face 26, but other shapes or configurations of end face 15 may be used so long as the surfaces of the tube end face 15 and the port end face 35 are adapted to form a seal when engaged with one another. Other such embodiments are discussed below in connection with FIGS. 6A, 6B, and 6C. In one embodiment, sleeve 12 is comprised of a metal, such as, for example, stainless steel. Those skilled in the art will appreciate that the sleeve 12 and/or outer tubing layer 19 may be comprised of steel or other materials such as titanium, fused silica, or a reinforced, rigid polymer material (e.g., carbon-fiber PEEK™, steel-braided TEFLON®). Particularly, rigid polymer materials may be more desirable in some applications, since stainless steel has some drawbacks in biological environments, as is described above.

Still referring to FIG. 5, additional features of the tubing assembly are shown in an enlarged cross-section view. Retention features 16 and 17, for example, are shown in more detail. As shown in FIG. 5, the retention feature 16 is a portion of sleeve 12 and is located at the end of the sleeve 12 which is closest to the face 15 defined by the end of the inner tube layer 13 and outer tube tip 14. Retention feature 16 is a protrusion or extension of sleeve 12 that provides a lip at the end of sleeve 12. As shown in FIG. 5, the outward edge of the lip 16 is located further from the longitudinal axis of the inner layer 13 than an adjacent portion 17 of the sleeve 12. The combination of features 16 and 17 help hold the outer tube tip 14 once attached to sleeve 12 and thus keep the combination of inner layer 13, outer tube tip 14, and sleeve 12 from being detached from one another.

Also shown in FIG. 5 is a recessed portion 40 of the sleeve 12 at the end opposite the location of the retention features 16 and 17. The recessed portion 40 can be a conically-shaped or parabollicaly shaped recess, such that the end of sleeve 12 with the recessed portion provides an opening with a diameter greater than that of the passageway through the sleeve 12. The recessed portion 40 thus makes it easier to insert an end of the combined inner layer 13 and outer layer 19 into the passageway through the sleeve 12 for easier and faster manufacturing of the tubing assembly comprising inner layer 13, outer layer 19, and the sleeve 12. In addition, the recessed portion 40 provides more flexibility to the tubing assembly once manufactured, because a user can more easily bend the portion of the inner layer 13 that extends out of the passageway of the sleeve 12 at the end opposite the end of the assembly at which surface 15 is located. As noted above, sleeve 12 and outer layer 19 can be secured together. In one embodiment, sleeve 12 comprises a metal (such as stainless steel), outer tubing layer 19 comprises a metal (such as stainless steel), and sleeve 12 and outer layer 19 are secured together by welding (or by crimping or swaging) at or near portion 40 of sleeve 12.

The tube tip 14 can be overmolded onto an end portion of the inner tubing layer 13, the outer tubing layer 19, and sleeve 12. For example, and as shown in FIG. 5, the inner tube 13 and outer tube 19 may be inserted through the passageway extending through the sleeve 12 so that the first ends of both the inner tube layer 13 and outer tube layer 19 extend a predetermined distance from the first end of the sleeve 12. The combination of the inner tube 13, outer tubing 19, and the sleeve 12 in this configuration can then have the outer tip 14 overmolded onto the combination, thereby forming the portion of the tubing assembly which comprises the inner layer 13 of the tube, the outer layer 19 of the tube, the sleeve 12, and overmolded tube tip 14. In one process for making this combination, the tube tip 14 is molded onto and over the inner layer 13, the outer layer 19, and the sleeve 12 by the process of injection molding. Those skilled in the art will appreciate that other processes may be used, such as casting and welding, and may be selected depending on the materials selected for the inner layer 13, the outer layer 19, and the tube tip 14. If desired, the surface 15 of the first end of the tubing as defined by the combination of the end of the inner layer 13 and the end of the tube tip 14 may be further finished, such as by cutting the first end of the tubing, polishing the first end of the tubing, or machining, with such processes performed to obtain a substantially flat surface 15 defined by the first ends of the inner layer 13 and the tube tip 14.

Figure 6A:
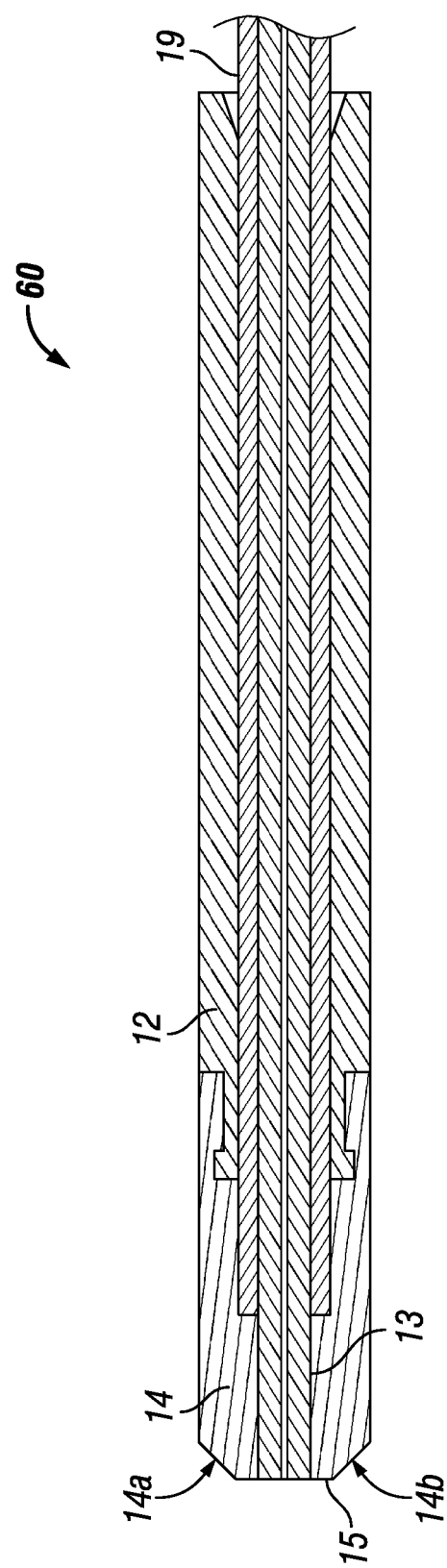
FIGS. 6A, 6B, and 6C are cross-sectional views of alternative embodiments of a tubing assembly in accordance with the present disclosure.
Figure 6B:
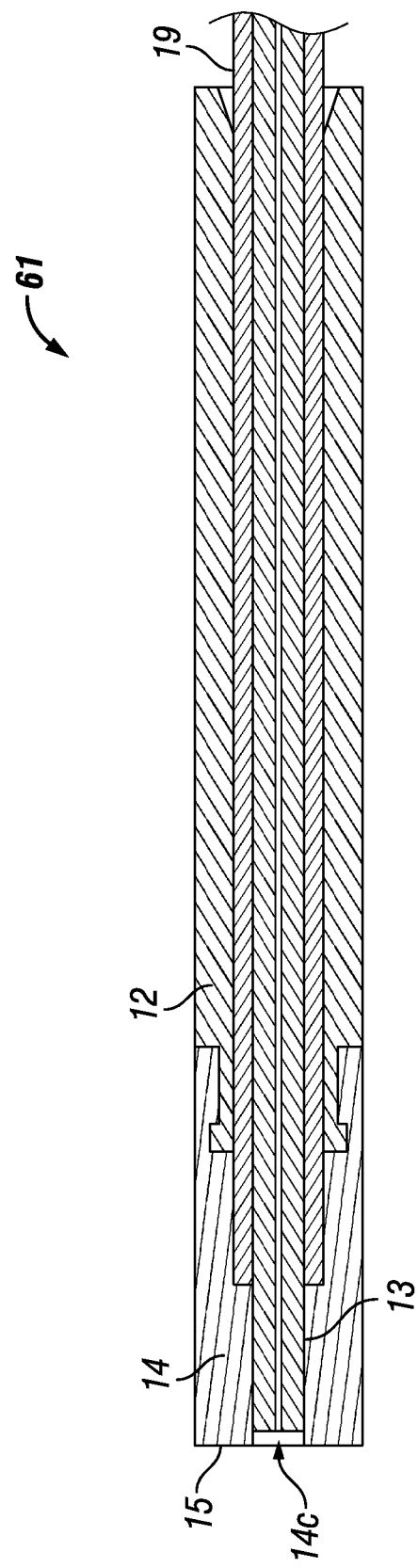
Figure 6C:
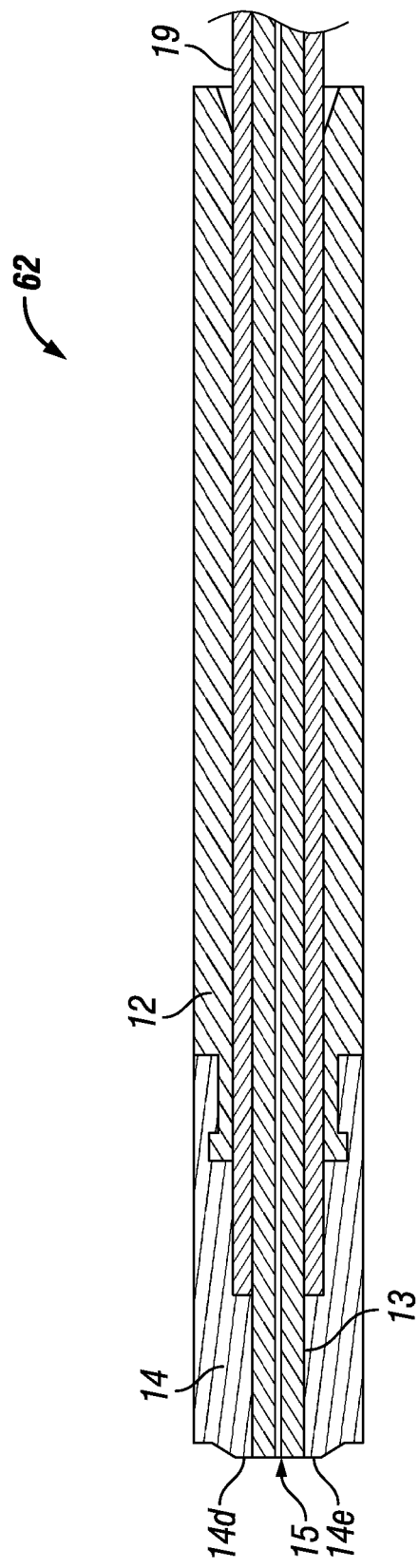

Referring now to FIGS. 6A, 6B, and 6C, alternative embodiments of a tubing assembly in accordance with the present disclosure are shown. Like numerals are used for the tip 14, inner tubing layer 13, sleeve 12, and outer tubing layer 19 in FIGS. 6A, 6B, and 6C for ease of reference. In FIG. 6A, a tubing assembly 60 is shown. The tubing assembly 60 includes an inner tubing layer 13, and outer tubing layer 19, a sleeve 12, and also a tubing tip 14. However, the tubing tip 14 in FIG. 6A has portions 14a and 14b which are angled from the outer diameter of the tip 14 towards the longitudinal axis of the tubing assembly 60. This configuration reduces the surface area of the surface 15 defined by the ends of the inner layer 13 and the tip 14 which is adapted to contact a face in a flat-bottomed port. It is believed that by reducing the surface area of the seal, we also are able to reduce the force required to obtain a seal.

Referring to FIG. 6B, a tubing assembly 61 includes an inner tubing layer 13, a sleeve 12, an outer tubing layer 19, and also a tip 14. As shown in FIG. 6B, the end of the inner tubing layer 13 is not flush with the end of the tip 14, thus leaving a gap 14c defined by the inner diameter of the tip 14. In the tubing assembly 61 of FIG. 6B, the surface 15 at one end of the tubing assembly 61 that is adapted to contact a surface in a flat-bottomed port is defined by the surface at the end of the tip 14 and not the end of the inner tubing layer 13. This configuration also reduces the surface area of the tubing assembly which is adapted to contact and seal with a flat-bottomed port.

Referring now to FIG. 6C, another embodiment is shown. In FIG. 6C, the tubing assembly 62 includes an inner tubing layer 13, a sleeve 12, an outer tubing layer 19, and a tip portion 14. The end of the tip portion 14 has portions 14d and 14e which include a "stepped" shape in which an outer portion extends towards the longitudinal axis of the tubing assembly 62 and then an angled portion extends from the step portion towards the end of the tip 14 and towards the longitudinal axis of the tubing assembly 62. This embodiment also helps reduce the surface area of the surface 15 defined by the combination of the end of the inner tubing layer 13 and the inner portion of the end of the tip 14 defined by the stepped end portions 14d and 14e.

Those skilled in the art will appreciate that other configurations besides those illustrated and described in this disclosure can be used in various applications of the tubing and fitting assemblies in accordance with the present disclosure. It will also be appreciated that the materials described above which can be used for the various features and components of the fitting and tubing assemblies of the present disclosure can likewise be used for the same or similar features and components of the tubing assemblies illustrated in FIGS. 6A, 6B, and 6C.

Figure 7A:
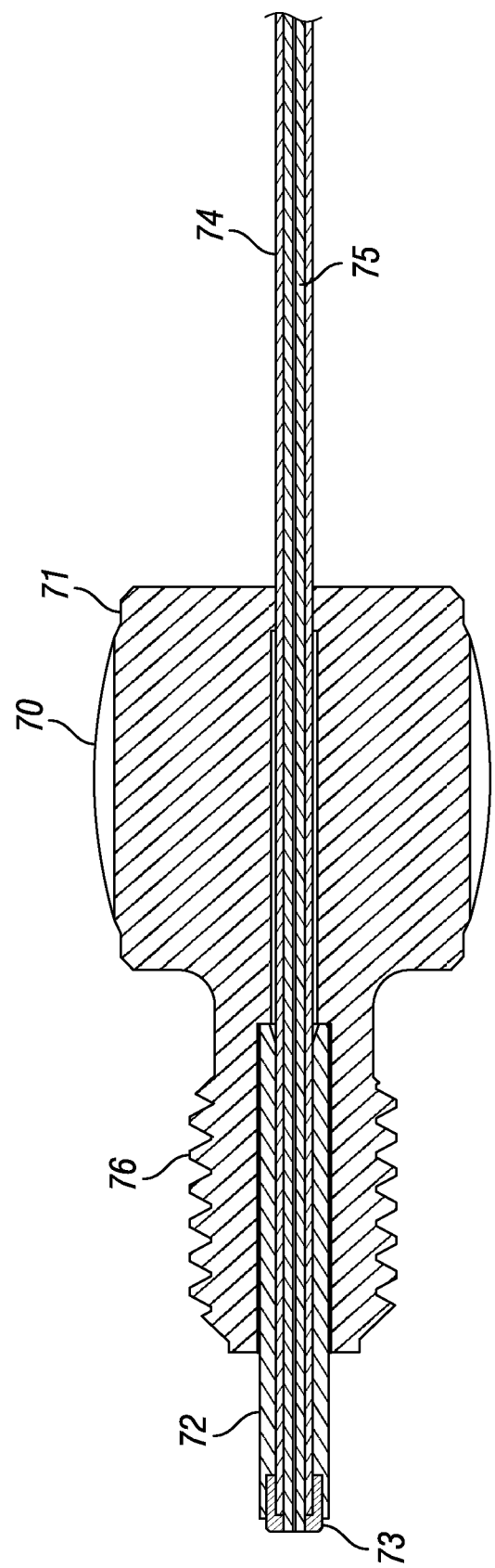
FIG. 7A is a cross-sectional view of a polymer-lined face sealing connection with an internal tip.
Figure 7B:
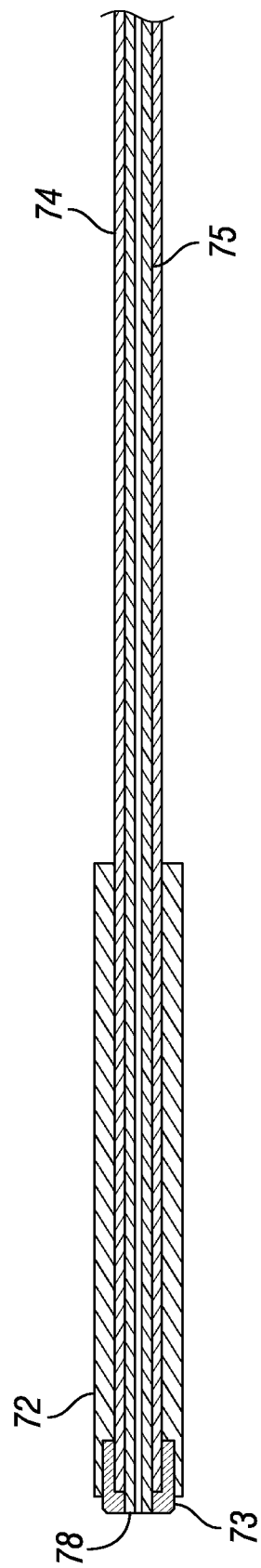
FIG. 7B is a detailed view of the embodiment of FIG. 7A.
Figure 7C:
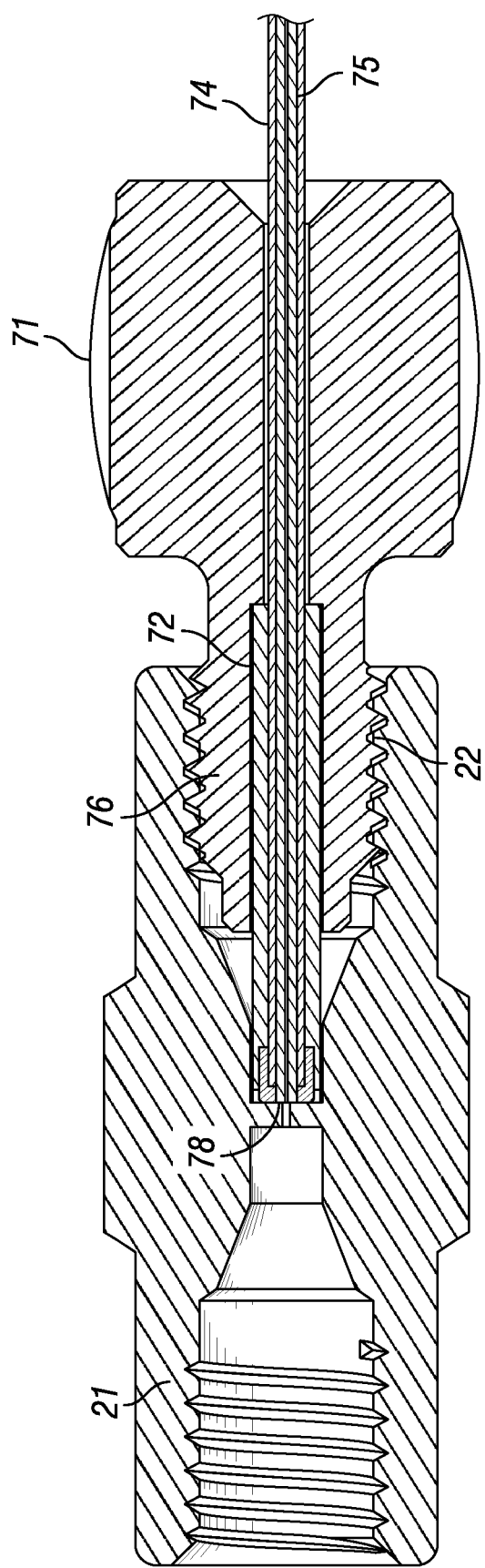
FIG. 7C is a view of a face sealing connection connected with a housing body.

A further embodiment is shown in FIGS. 7A-C. The embodiment of FIG. 7A also includes an actuator nut 70, comprising a head portion 71 at a first end thereof and a threaded portion 76 near a second end thereof, wherein the external threaded portion 76 is configured to interact with an internally threaded connection 22, in a housing 21, best shown in FIG. 7C. The nut defines a passageway therethrough sized and shaped to contain a liner tubing 75 and a reinforcement tubing 74, wherein the liner tubing 75 can be concentrically contained with the reinforcement tubing 74. A portion of the passageway proximate and at least partially contained with the externally threaded portion 76 is also sized to contain a transfer tubing 72. In the embodiment shown in FIG. 7C, the reinforcement tubing 74, the liner tubing 75 and the transfer tubing 72 extend out of the passageway through the second end of the nut 70 and terminate at tube end face 78. The transfer tubing 72 can be secured to the reinforcement tubing 74 by swaging or crimping onto the tubing with mechanical force radially or by any appropriate means known to those skilled in the art that allows for axial forces resulting from the fluid pressure reacted through the transfer tubing 72 and reinforcement tubing 74, such as welding, for example. This configuration (shown in FIG. 7D) allows the tip 73 to be compressed between the reinforcement tubing 74 and a port bottom, which aids in creating a fluidic seal and prevents dead volume. The liner tubing 75 can be secured in the reinforcement tubing by an interference fit formed by feeding liner tubing 75 with an outer diameter greater than the internal diameter of reinforcement tubing 74 through the reinforcement tubing 74, thereby providing a tight interference fit, or such as by feeding liner tubing 75 through reinforcement tubing 74 and then either increasing the outer diameter of the liner tubing 75 or decreasing the inner diameter of the reinforcement tubing 74, or by other means known to those skilled in the art.

As further shown in FIG. 7 A, the device further comprises a tip 73. As shown, the reinforcement tubing 74, the liner tubing 75 and the transfer tubing 72 extend out the second end of the nut 70 and terminate in a tube end face 78, in proximity to each other at a distance from the second end of the nut, configured to extend into a housing 21 through and past an internally threaded portion as described above. The tip 73 is disposed at the terminal end and is positioned to contact a face of a port extended into the housing 21 as shown in FIG. 7C.

During use, the nut 70 is reversibly connected to the housing by threading the external threads into a housing and reversibly connecting a port to the opposite end of the housing, a face seal is established between the tip and the bottom of the port without the use of ferrules to grip the tubing. The fitting assembly nut 70 drives against the bearing surface of the transfer tubing 72 to push the sealing surface of the tip 73 into and against the port bottom. The tip seal to the liner tubing 75 is created by an interference fit created by the internal diameter of the tip being smaller than the outside diameter of the tubing that requires the liner tubing 75 to be drawn into the tip 73. The tip 73 can be slid into position against the reinforcement tubing 74. The transfer tubing 72 is slid over the outside of the tip 73 and crimped into place by means known to those skilled in the art including, for example, the presence of angled surfaces that interact to create a taper lock interference fit. In the embodiment described and shown in FIGS. 7A-C, there are not any angles on the tip 73, transfer tubing 72, reinforcement tubing 74, or liner tubing 75. The assembly instead uses the interference between the components to retain the integrity of the seal and connection system. The reinforcement tubing 74 and transfer tubing 72 can be metal, selected from but not limited to stainless steel, steel, or titanium. The tip 73 and liner tubing 75 can be made of softer materials, including polymers such as PEEK, carbon filled PAEK, PEEK, PEKK, PEP, PF A, ETFE, or PTFE, for example. The nut 70 can comprise either one or more metals such as stainless steel, aluminum, titanium, or nickel, for example, or one or more polymers as appropriate for the intended use in particular systems, and with particular fluids.

A closer view of the fitting including the tubing and passageway is shown in FIG. 7B. As can be seen in the figure, the liner tubing and reinforcement tubing are drawn into the interior diameter of the tip to provide an interference fit. The transfer tubing can then be slid over the outside of the tip and in place, or held in place by other appropriate methods known in the art. The fitting is shown in FIG. 7C as it interacts with a housing body 21 for connection to a port. As shown in the figure, the tubing end face 78 extends through the threaded portion 76 and into the housing body past the mated threaded portions 76 and 22. The terminal end face can thus be pressed against a port end face to create a seal.

Figure 7D:
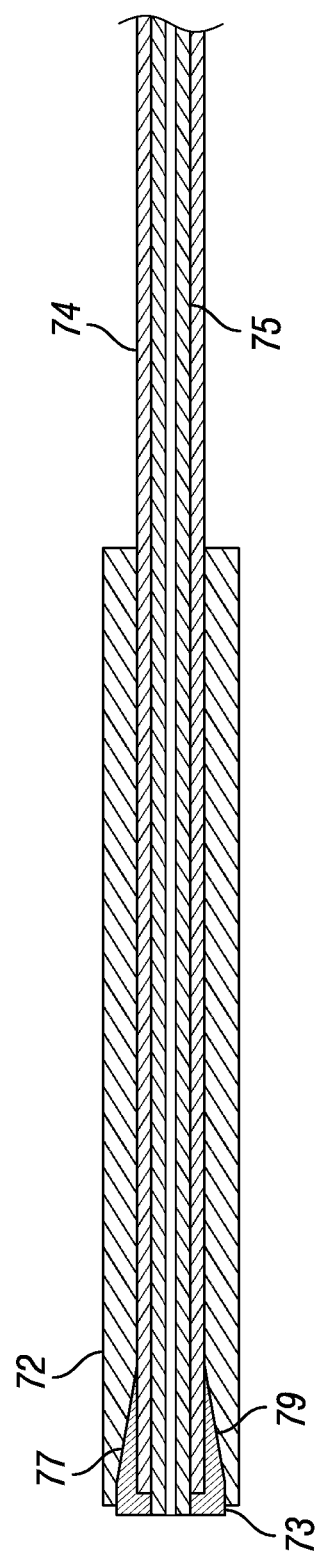
FIG. 7D is a detailed cross-sectional view of an embodiment of a fitting assembly with an internal tip.

An alternate embodiment of the fitting of FIG. 7A-C is shown in FIG. 7D. As shown in the figures, the second end of the transfer tubing 72 includes an angled internal face portion 77 and the tip 73 includes an oppositely angled outer face portion 79 to facilitate easier insertion of the tip 73 into the transfer tubing 72 by a user.

Figure 8A:
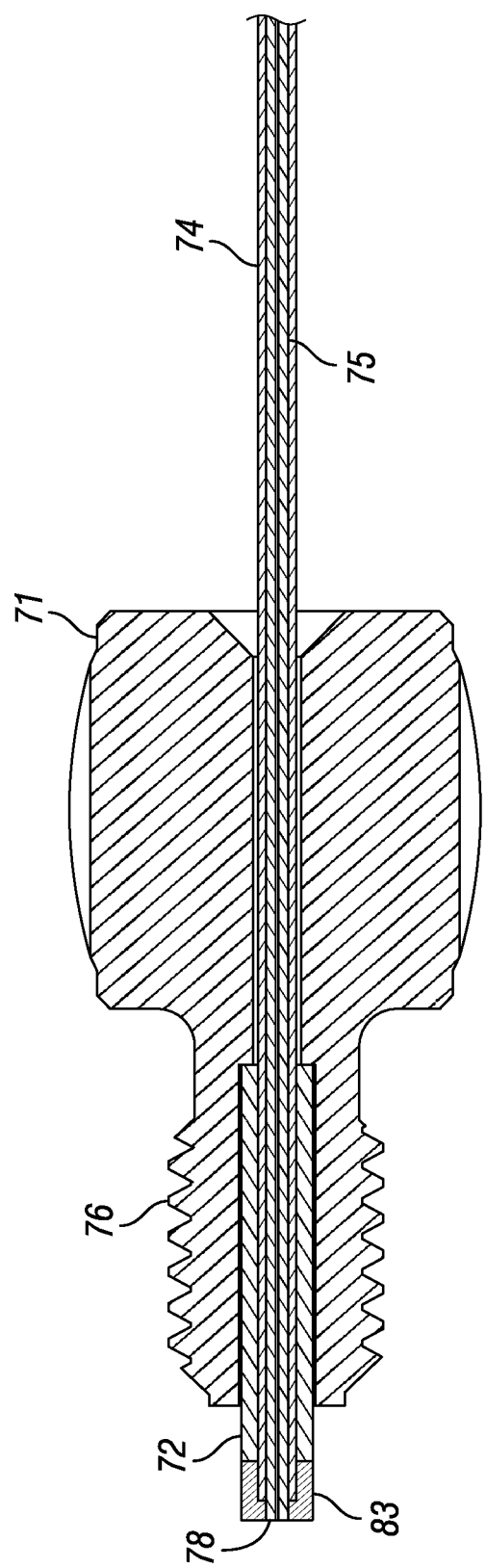
FIG. 8A is a cross-sectional view of a polymer-lined face sealing connection with an external tip.
Figure 8B:
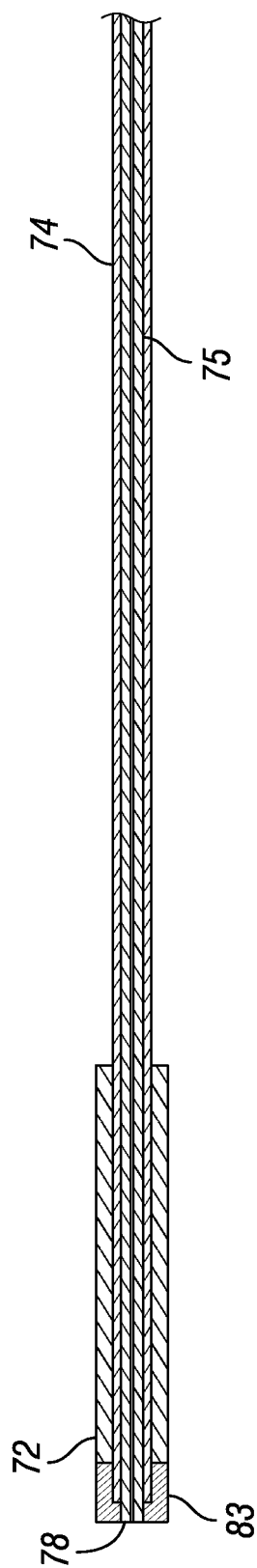
FIG. 8B is a detailed view of the embodiment of FIG. 8A.
Figure 8C:
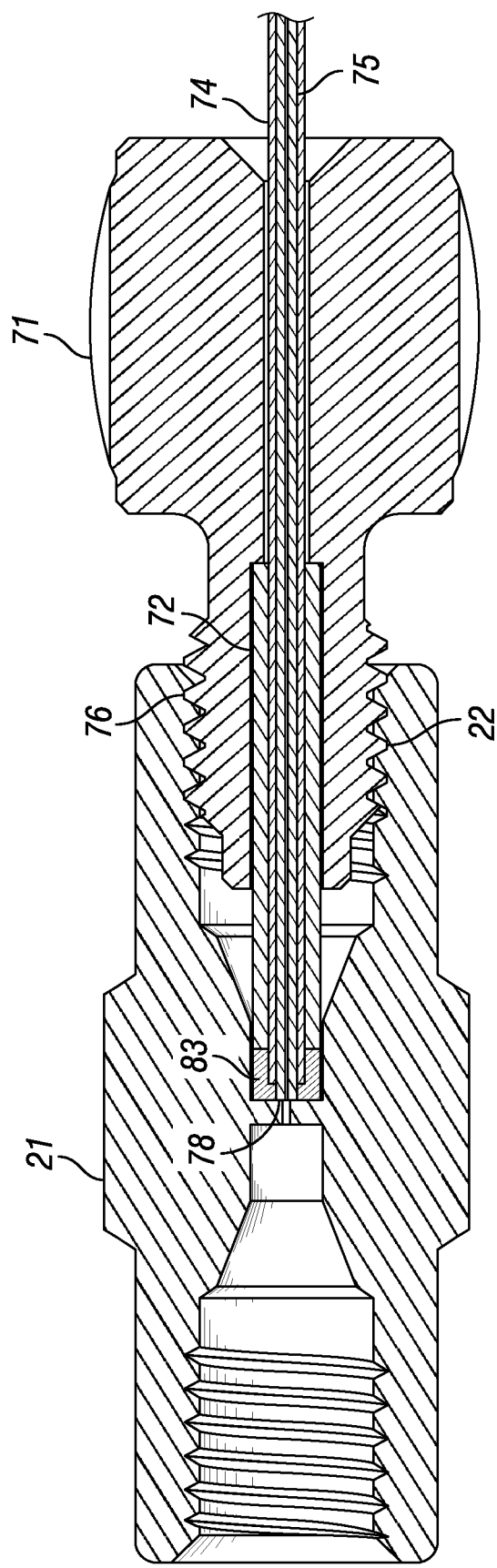
FIG. 8C is a view of a face sealing connection connected with a housing body.

An embodiment including an alternate tip 83 is shown in FIGS. 8A-C. In this embodiment, all common items are numbered the same as in the embodiment shown in FIGS. 7A-C. The tip 83 shown in FIGS. 8A-C, however, is no longer captured by the transfer tubing 72 with an interference fit. This embodiment instead uses the transfer tubing 72 to drive against the tip 83 during assembly to create a face seal on a sealing surface in a port and the surfaces contacting the transfer tubing 72. The tip 83 is drawn onto the tubing and utilizes an interference fit to create a seal between the liner tubing 75 and tip 83. All of the components of the embodiment of FIGS. 8A-C can be manufactured from the same materials as the embodiment shown in FIGS. 7A-C.

An enlarged view of the embodiment of FIG. 8A is shown in FIG. 8B. In this view it is shown that the transfer tubing 72 is shortened from the tube face end 78 such that the tip abuts the terminal end of the transfer tube 72, while the liner tubing 75 and reinforcement tube 74 are contained in the inner diameter of the tip 83. A view of a fitting as described in FIG. 8A connected to a housing body 21 is shown in FIG. 8C. As describe above, when the nut is driven into the housing, the tip 83 at the tube face 78 is forced against a port face by the transfer tubing 72 to create a face seal.

Figure 9A:
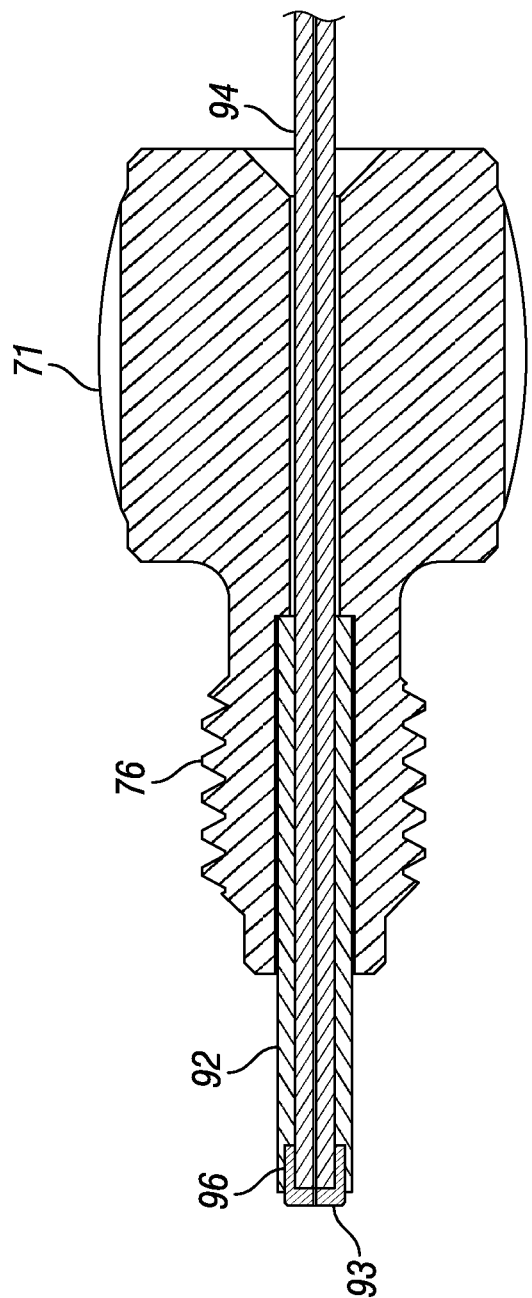
FIG. 9A is a cross-sectional view of another embodiment of a polymer lined face sealing connection.
Figure 9B:
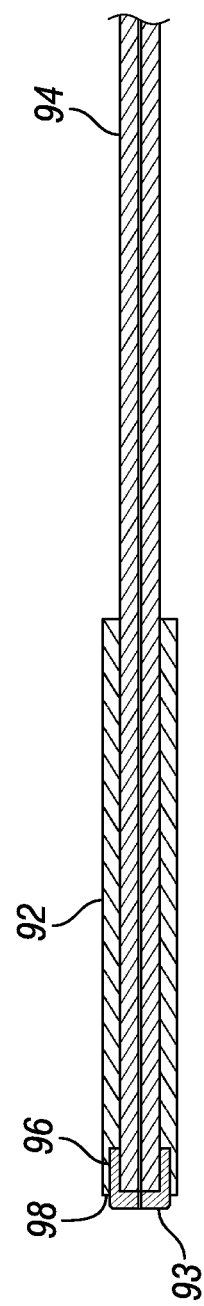
FIG. 9B is a detailed view of the embodiment of FIG. 9A.
Figure 9C:
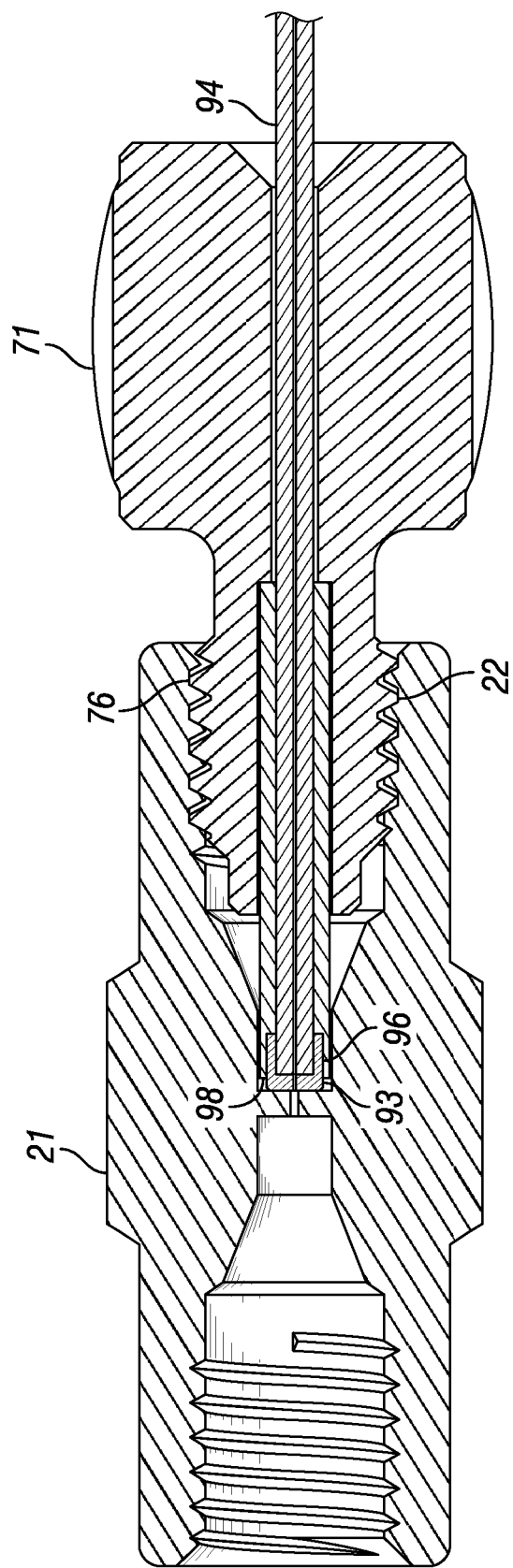
FIG. 9C is a view of a face sealing connection connected with a housing body.

Another embodiment of a connection assembly is shown in FIGS. 9A-C. This embodiment does not include a liner tubing. The embodiment uses the sealing of the tip 93 in a port bottom along with sealing of the tip 93 to a conduit tubing 94. The transfer tubing 92 translates the load from the rotational torque of the nut when applied by an operator to both sealing areas of the tip 93. The transfer tubing 92 in this embodiment can be made of a more durable or less resilient material such as a metal material, with stainless steel being an exemplary material, and the transfer tubing includes a pocket portion 96. There is interference between the outside diameter of the tip 93 and the pocket portion 96 in the transfer tubing 92. The interference is effective to retain the tip 93 on the conduit tubing 94 during assembly and disassembly. In addition, the face of the tip is effective to form a seal with a port sealing face as shown in FIG. 9C. The use of a stainless steel transfer tubing 92 allows for the use of higher pressures. Pressures in excess of 15,000, 20,000, and 25,000 psi have been achieved in test samples of this embodiment without leaking. The conduit tubing 94 and transfer tubing 92 can be manufactured from and comprise stainless steel tubing, for example, or can be made from other metals as known to those skilled in the art. The tip 93 can include one or more polymers such as PEEK, carbon fiber reinforced PEEK, PEKK, FEP, PFA, ETFE, or PTFE, for example. The fitting can be either a metal such as stainless steel, aluminum, or titanium, for example, or one or more polymers depending on system requirements. An enlarged view of the tubing as shown in FIG. 9A is shown in FIG. 9B, in which the tip 93 can be seen extending into the pocket portion 96 effective to be held against the conduit tubing 94 and forming a tube face end effective to form a face seal with a port seal face as shown in FIG. 9C.

Additional embodiments of the disclosed connection assemblies that can be used to form a face seal with various flat bottomed ports or fixtures as required and that do not include a liner tubing are shown in FIGS. 10-13. The connector assembly shown in FIG. 10 includes a transfer tubing 92 surrounding the conduit tubing 94 as in the embodiment shown in FIG. 9A. There is again interference in this embodiment between the outside diameter of the tip 93 and the pocket portion 96 and the transfer tubing 92. It can be seen in this embodiment that the end face 98 of the transfer tube is flush with the end face 99 of the conduit tubing 94.

Figure 11:
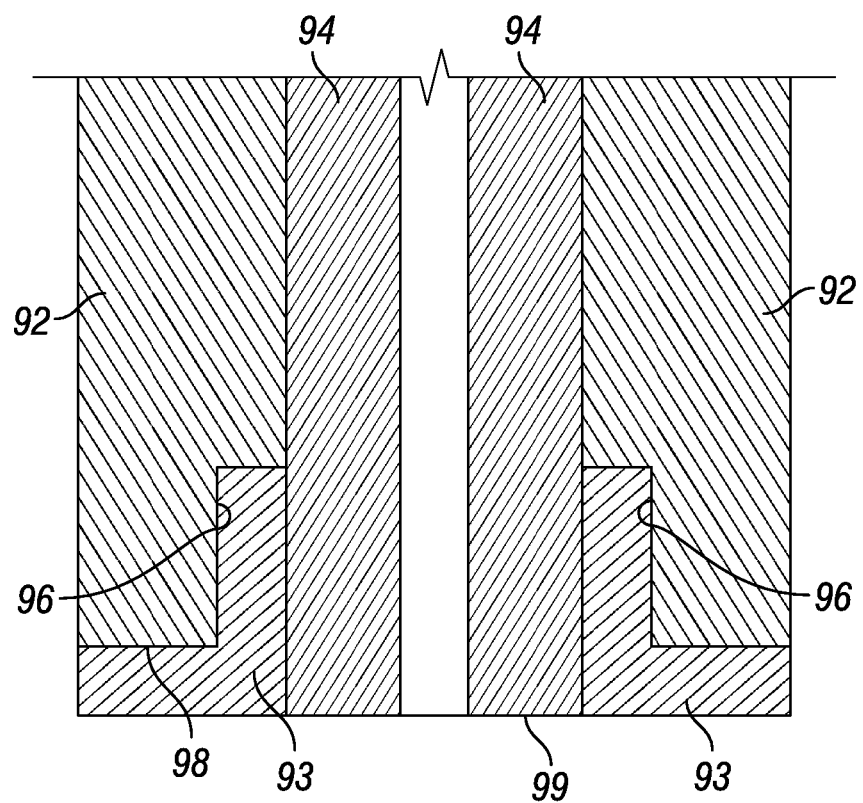
FIG. 11 is an enlarged cross-sectional view of an end of one particular embodiment of an assembly according to the present disclosure.
Figure 12:
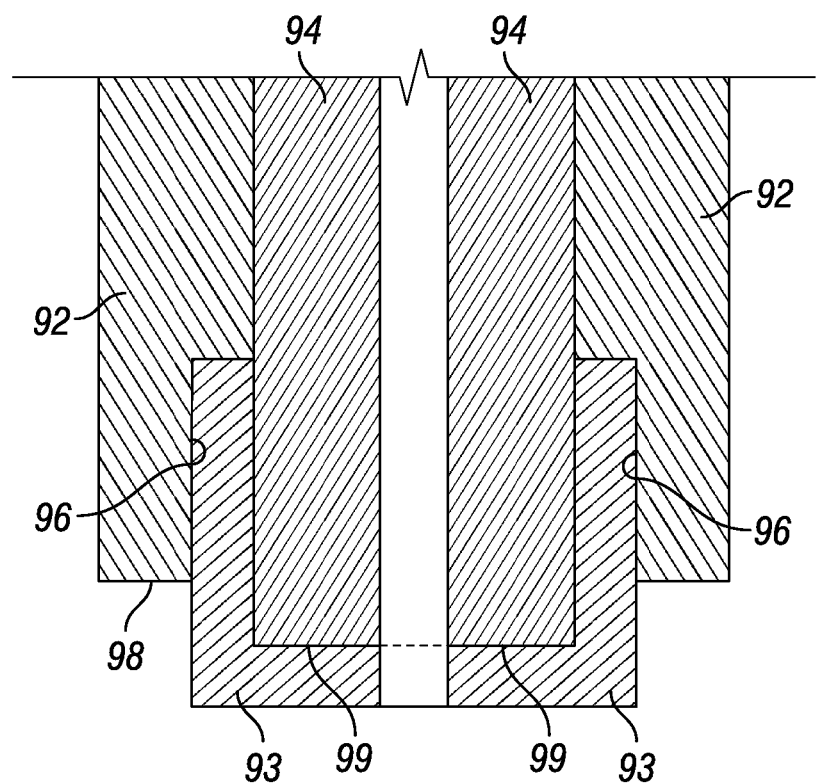
FIG. 12 is an enlarged cross-sectional view of an end of one particular embodiment of an assembly according to the present disclosure.

An additional embodiment is shown in FIG. 11 in which the end face 99 of the conduit tubing 94 extends beyond the end face 98 of the transfer tubing 92. The pocket portion 96 and the tip in this embodiment extend from the inner diameter to the outer diameter of the conduit tubing 94 and is not disposed between the end of the conduit tubing and the port (not shown). A further embodiment is shown in FIG. 12 in which the end face 99 of the conduit tubing 94 extends even further out of the transfer tubing 92. Such connection assemblies are shown to indicate that the disclosed embodiments can be altered or configured to effectively seal with a variety of connectors or ports as needed, or to provide an effective seal at various pressures and volumes.

Figure 10:
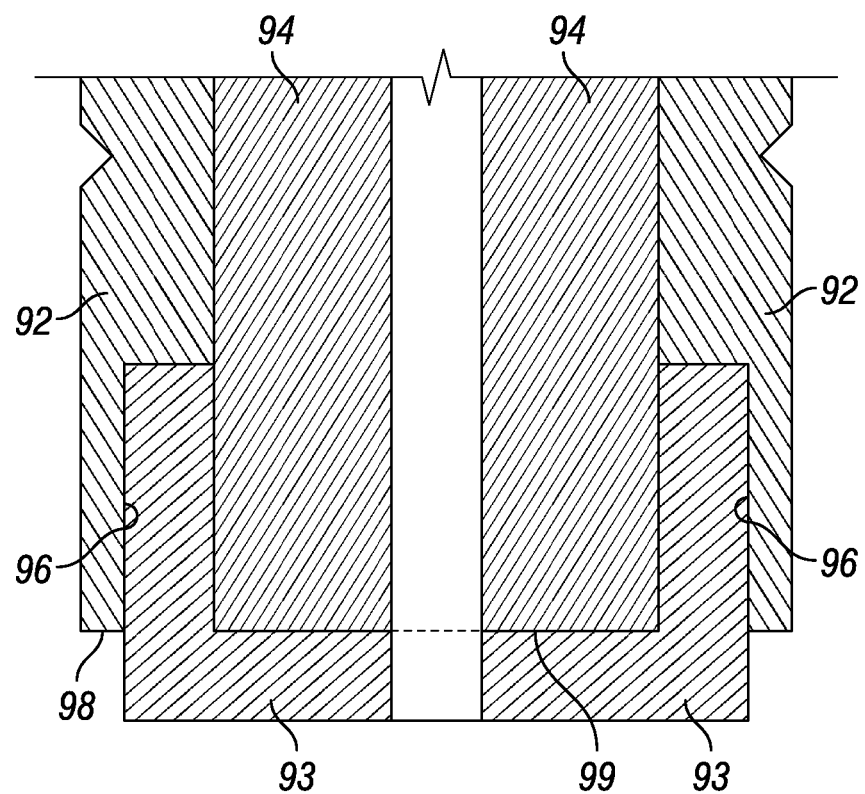
FIG. 10 is an enlarged cross-sectional view of an end of one particular embodiment of an assembly according to the present disclosure.

As described for FIG. 9, the embodiments shown in FIGS. 10-12 do not include a liner tubing. The embodiments use the sealing of the tip 93 in a port bottom along with sealing of the tip 93 to a conduit tubing 94. The transfer tubing 92 translates the load from the rotational torque of the nut when applied by an operator to both sealing areas of the tip 93. The transfer tubing 92 in these embodiments can be made of a more durable or less resilient material such as a metal material, with stainless steel being an exemplary material, and the transfer tubing includes a pocket portion 96. There is interference between the outside diameter of the tip 93 and the pocket portion 96 in the transfer tubing 92. The interference is effective to retain the tip 93 on the conduit tubing 94 during assembly and disassembly. In addition, the face of the tip is effective to form a seal with a port sealing face. The use of a stainless steel transfer tubing 92 allows for the use of higher pressures. The conduit tubing 94 and transfer tubing 92 can be manufactured from and comprise stainless steel tubing, for example, or can be made from other metals as known to those skilled in the art. The tip 93 can include one or more polymers such as PEEK, carbon fiber reinforced PEEK, PEKK, FEP, PFA, ETFE, PEEKsil, or PTFE, for example. Alternatively, the conduit tubing 94 can be a capillary tube, such as a capillary made of silica, fused glass, PEEKsil (fused silica with a sheath of polyetheretherketone), the transfer tubing 94 can be made of a polymer such as one or more of those noted above, and/or the tip 93 can be made of metal, such as stainless steel. The fitting can be either a metal such as stainless steel, aluminum, or titanium, for example, or one or more polymers depending on system requirements.

Figure 13:
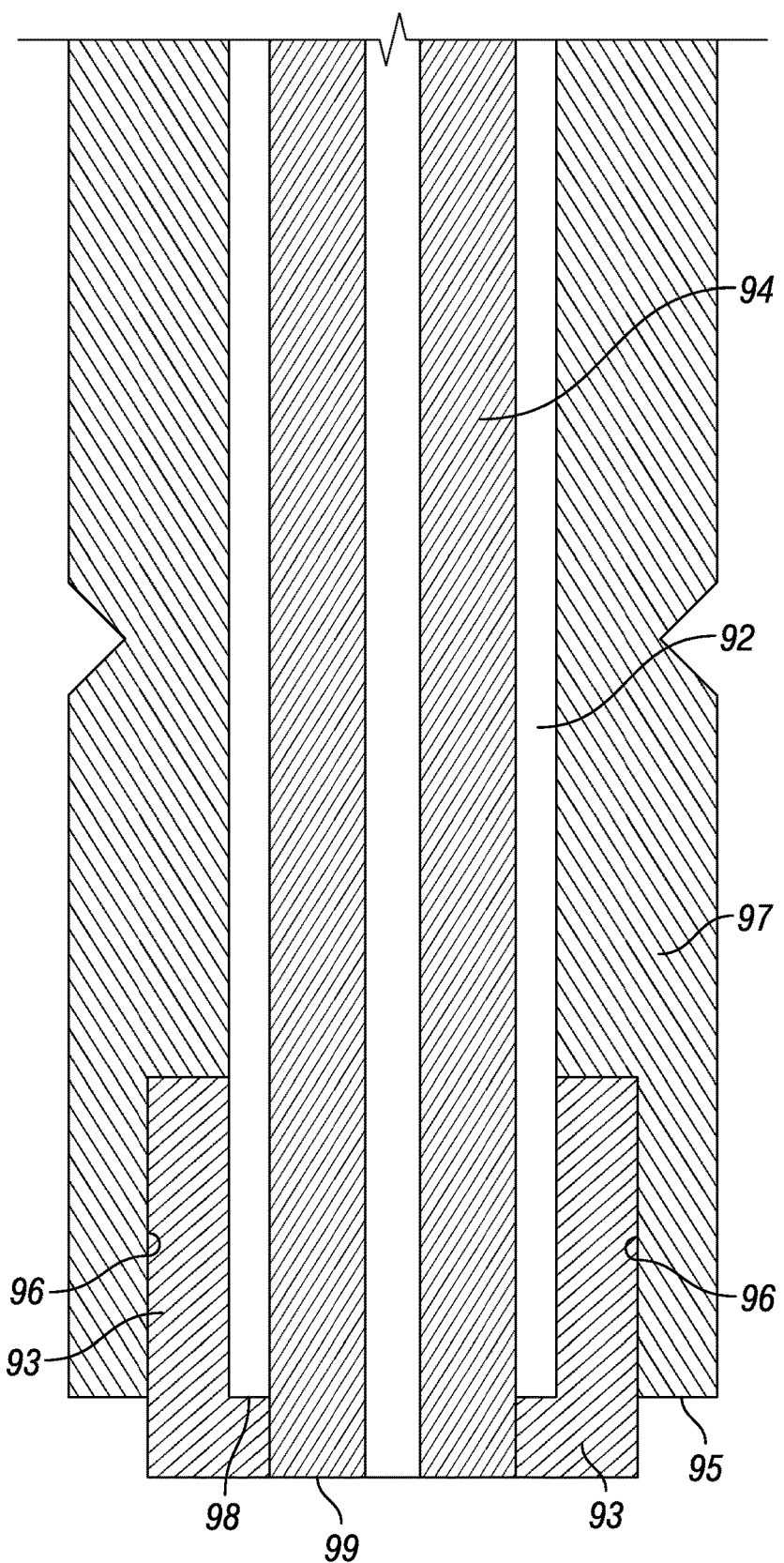
FIG. 13 is an enlarged cross-sectional view of an end of one particular embodiment of an assembly according to the present disclosure.

Referring now to FIG. 13, yet another alternative embodiment of the present disclosure is provided. FIG. 13 is an enlarged cross-sectional view of an end of the assembly. In FIG. 13, an assembly is shown which includes conduit tubing 94, transfer tubing 92, and a tip 93. In addition, the assembly includes a sleeve 97. As shown in FIG. 13, the sleeve 97 includes pockets 96 in which a portion of the tip 93 is located. In this particular embodiment, the end face 99 of conduit tubing 94 is flush with an end face of the tip 93, and the end faces of tip 93 and conduit tubing 94 are adapted to abut a port (not shown in FIG. 13). As also shown in FIG. 13, in this particular embodiment, an end face 95 of the sleeve 97 is flush with the end face 98 of the transfer tubing 92. Those skilled in the art will appreciate that the transfer tubing 92, conduit tubing 94, sleeve 97, and tip 93 can each be made of various materials, including those noted above for the embodiments shown in FIGS. 10-12, including polymeric, metal, and ceramic materials, and may be varied depending on the intended application of the assembly, such as the pressures involved, the solvents and fluids involved, and the like.

Figure 14:
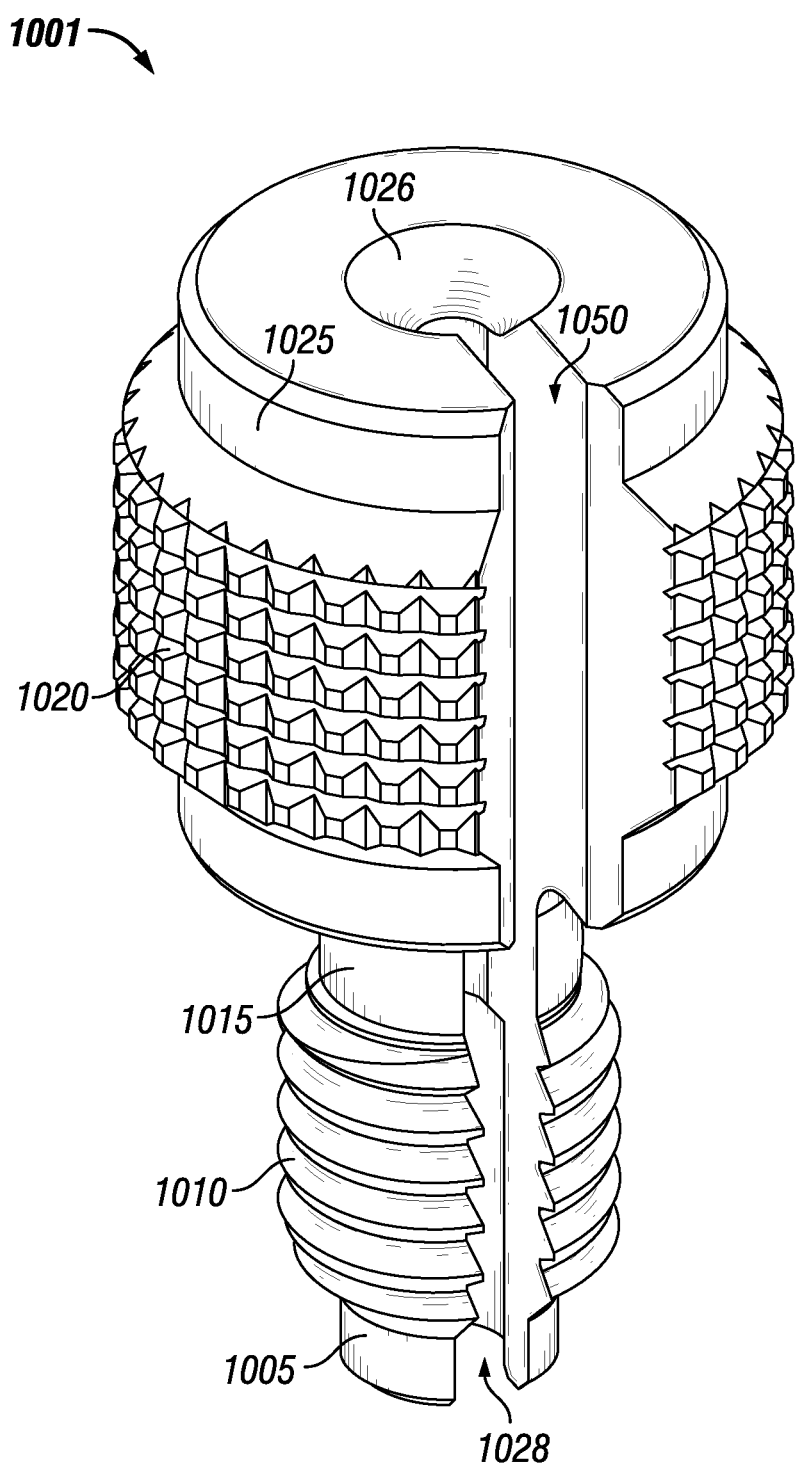
FIG. 14 is an isometric view of an alternative nut which can be used in embodiments of the present disclosure.

In FIG. 14, an alternative nut 1001 is shown. The nut 1001 can be used in any of the foregoing embodiments. As shown in FIG. 14, the nut 1001 has a first end portion 1005, as well as an externally threaded portion 1010, a lower portion 1015, a knurled portion 1020, and a top portion 1025 at the second end of the nut 1001. The nut 1001 has openings 1026 and 1028 at its top and bottom (or second and first) ends, respectively. The openings 1026 and 1028 are open to a passageway 1030 (shown in FIGS. 15 and 16) extending longitudinally through the nut 1001. The nut 1001 also has a slotted, grooved or split portion 1050. As shown in FIG. 14, the slot or groove 1050 extends the longitudinal length of the nut 1001. Radially, the groove 1050 also extends from the outer surface of the nut 1001 to the passageway 1030 (not shown in FIG. 14) extending along the longitudinal axis of the nut 1001.

The groove or slot 1050 of the nut 1001 provides an advantage because it allows an operator to route a tube (such as described above in various embodiments) through an analytical instrument system and/or its various components, then add the nut 1001 to make up a connection with the fitting assembly after the tube is roughly in place. In a number of applications, the space for the various components can be limited and fairly tight, and in such situations having the nut captivated on the tube assembly can make it difficult to route the assembly to the proper location to make up a connection. Because tubes periodically need to be replaced in AI systems, having the slot 1050 on the nut 1001 allows for easier location and for easier and faster replacement of tubing in many situations. This approach also makes it easier and more common for reuse of the nut 1001, since the nut 1001 need not be attached to the tubing. The groove 1050 also may allow for easier use of the nut 1001 when the nut 1001 is rotated in engagement with a port, such as a port in an LC, HPLC, UHPLC, or other AI system, or other component, such as in such a system (which could be a union, pump, column, filter, guard column, injection valve or other valve, detector, pressure regulator, reservoir, or another fitting, such as a tee, cross, adapter, splitter, sample loop, connector, or the like) to make a fluidic connection, such as when used in connection with the embodiments of this disclosure described above. Those skilled in the art will appreciate that, in an alternative embodiment, the nut 1001 could have an internally threaded portion (not shown) adapted to engage with an externally threaded portion of a port or other component such as those listed, or could be otherwise configured to provide axial loading.

The nut 1001 can be made of a metal, such as, for example, stainless steel. Those skilled in the art will appreciate that the nut 1001 may be comprised of other materials such as titanium, fused silica, or a reinforced rigid polymer material (e.g., a carbon-fiber PEEK™ or other metal-braided polymer material). More rigid polymer materials may be more desirable in some applications, since stainless steel has some drawbacks in biological environments. For example, components in a biological fluid can attach to stainless steel, and stainless steel ions may leak into said fluid—both events having the potential to obscure measurements in liquid chromatography and other analytic chemistry applications. The nut 1001 thus can comprise biocompatible materials, such as polyetheretherketone (PEEK), which are generally inert with respect to biological materials. Those skilled in the art will appreciate that the slot 1050 of the nut 1001 need not run the entire longitudinal length of the nut 1001. In addition, a plurality of slots can be provided instead of a single slot 1050. For example, the nut 1001 could have a top slot at the top end 1025 of the nut 1001 and also a bottom slot at the bottom end 1005 of the nut 1001.

Figure 15:
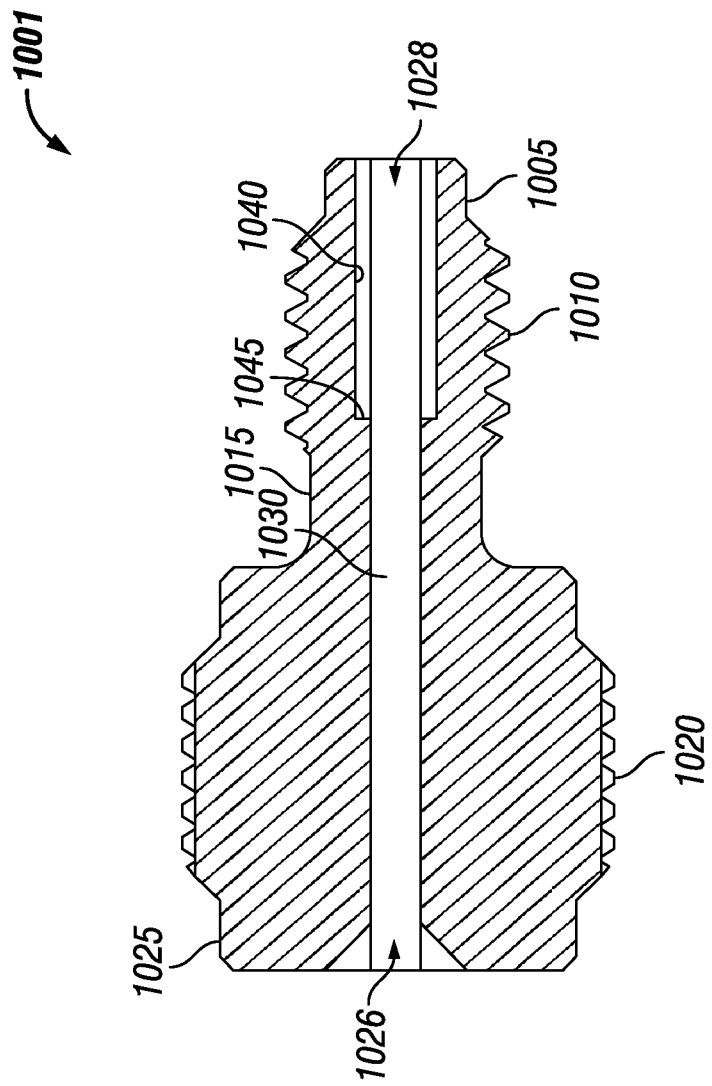
FIG. 15 is a cross-sectional view of the alternative nut of FIG. 14 and can be used in embodiments of the present disclosure.

Referring now to FIG. 15, a cross-sectional view of the nut 1001 is shown. Like features in FIGS. 14-16 have the same numerals for ease of reference. As shown in FIG. 15, the nut 1001 has a passageway 1030 extending through the nut 1001 generally along the longitudinal axis of the nut 1001. The first end portion 1005, externally threaded portion 1010, lower portion 105, knurled portion 1020, and second end 1025 correspond to those portions as shown in FIG. 14. As also shown in FIG. 15, the nut 1001 has an interior seating portion 1040 proximate towards the first end 1005 of the nut 1001, with the interior seating portion 1040 open to opening 1028. The interior seating portion 1040 is adapted to receive and removably hold a tube assembly comprising a tube and a liner sleeve, transfer tube, or other sleeve (not shown in FIG. 15) in place. For example, any of the sleeves described above, including without limitation the sleeve 12 or sleeve 92, can be adapted to fit within the interior seating portion 1040 of the nut 1001. Moreover, the interior seating portion 1040 at one end has an end portion 1045. As shown in FIG. 15, the interior seating portion 1040 has a wider diameter than that of other portions of the passageway 1030 in the nut 1001. The end portion 1045 provides a seat at one end of the interior seating portion 1040. When assembled, the seat at the end portion 1045 of nut 1001 allows a compressive force to be applied by the end portion 1045 against a sleeve held within the interior seating portion 1040 of the nut 1001, such as when the nut 1001 is rotated relative to a port or other component to make up a fluidic connection or fitting assembly, such as described above with respect to other embodiments, thereby transferring the compressive force to the end of the tube assembly as it abuts a face in a port or other component.

Figure 16:
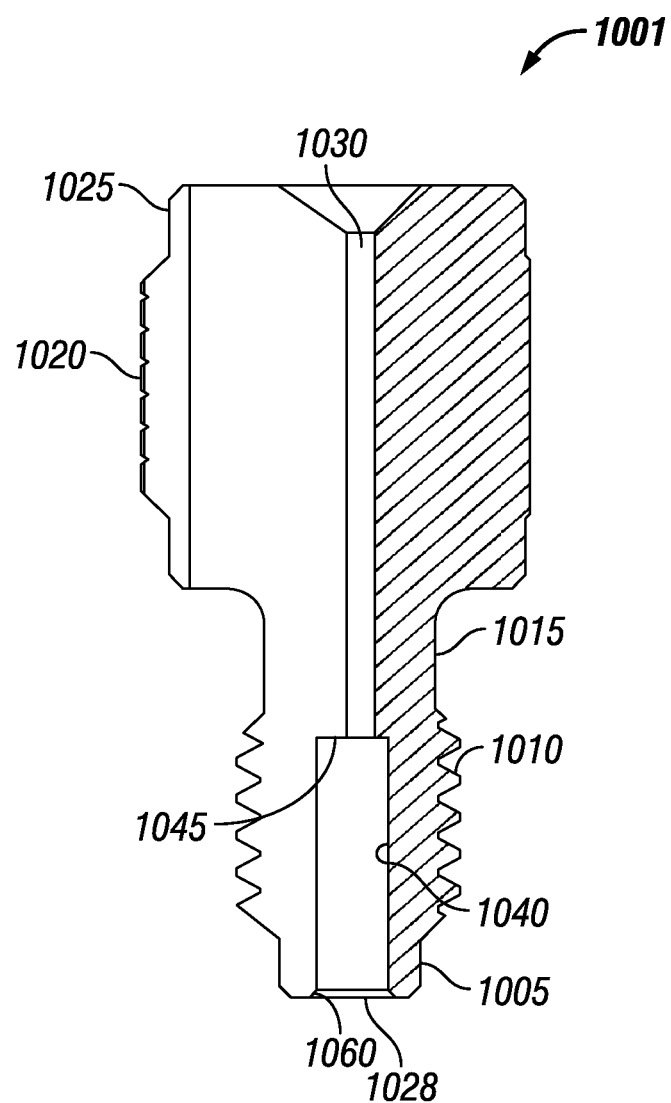
FIG. 16 is a second cross-sectional view of the alternative nut of FIGS. 14 and 15 and can be used in embodiments of the present disclosure.

Now referring to FIG. 16, a different cross-sectional view of the nut 1001 is provided. As with FIG. 15, the numbering in FIG. 16 uses like numerals to refer to the same features as shown in FIGS. 14 and 15 for convenience. The longitudinal extension along the length of the nut 1001 of the slot 1050 (not labelled in FIG. 16), as well as its radial extension from the passageway 1030 to the exterior surface of the nut 1001, becomes apparent with a comparison of FIGS. 15 and 16. Also shown in FIG. 16 is a flared portion 1060 located at the first end of the nut 1001. The portion 1060 provides an opening 1028 with a wider diameter than the interior seating portion 1040, thus allowing a user to more easily and quickly insert a tubing assembly (such as a combination comprising a tube and a sleeve as described above) into the nut 1001.

It will be appreciated that, as noted below, the tubing, and also the components of a fitting assembly or connection system, used in many analytical instrument systems for fluidic connections can be very small. Moreover, the components used in many analytical instrument systems can vary, and often need to be changed or replaced, such as replacing columns, pumps, injection valves, and so forth, whether when switching from one particular application of the system for one type of analysis to another or substantially re-organizing the system and its components. Given the small size of the tubing and fitting assembly or fluidic connection components, such as nuts, ferrules, sleeves, transfer tubing, tips, and so forth, especially together with the complexity of many analytical instrument systems, many operators often spend additional time and effort locating the tubing for a connection or locating an fitting assembly, sometimes in very awkward or difficult to reach locations. By providing a slot 1050 in the nut 1001, an operator can more easily install or disconnect a fluidic connection in an AI system. For example, to make a connection, an operator can first locate or insert the nut 1001 in a port, and then easily insert a portion of the tubing or tube assembly through the slot 1050 of the nut 1001, and then tighten the nut 1001 in the port to form a sealed connection. Similarly, an operator, when disconnecting a fluidic connection, can simply rotate the nut 1001 relative to the port to loosen the fitting assembly and, without removing the nut 1001 from the port, remove the tubing by pulling the tubing through the slot 1050.

Those skilled in the art will appreciate that the current disclosure provides a tubing assembly and a fitting assembly which can be used for making one or more connections in any system that utilizes a face seal (such as a flat-bottomed port), and can withstand the fluid pressures required for ultra-high pressure liquid chromatography (UHPLC) and other analytical instrument applications. While PEEK lined steel (PLS) tubing has been used in other applications, those skilled in the art will appreciate that the tubing and fitting assembly of the present disclosure overcomes issues with the use of PLS, such as, for example, difficulties encountered by users because of the inability of PLS to bend. Those skilled in the art will appreciate that the fitting and tubing assembly configurations described and shown in this disclosure focus on only one end of the tubing and fitting assembly, but the present disclosure may be used in embodiments as a complete fluidic connection between two components, for example, such as a connection including two nuts and tubing with two ends such as described and shown in this disclosure for providing a fluid connection between any two points in an analytical instrument system or other system.

Those skilled in the art will further appreciate that the tubing and fitting assemblies shown and disclosed herein will successfully handle fluid connections in systems in which small volumes of a fluid at high pressures are needed. For example, the tubing in accordance with the present disclosure may have an outside diameter (OD) in the range of from about 1/64 inches to about 1/4 inch, or about 1/64, 1/32, 1/16, 1/8 or 1/4 of an inch in diameter inclusive, and may have an inner diameter (ID) of from about 0.001 to about 0.085 inches, or about 0.001, 0.002, 0.006, 0.010, 0.015, 0.020, 0.025, 0.030, 0.060, or 0.085 inches, inclusive. Moreover, the assembly described and shown in this disclosure is capable of UHPLC pressures (>18,000 psi) at finger-tight torque values of 2-3 in*lbs, for example. The assemblies are also flexible and capable of multiple connection uses prior to failure. It is believed that the fitting assembly of the present disclosure is able to translate rotational torque directly to axial force to generate the seal with a flat-bottom port which will hold at very high pressures like those noted. Those skilled in the art will also appreciate that the fitting assembly of the present disclosure does not require any ferrules or other similar sealing mechanisms, is easy to use by an operator, and can generate a seal at high pressures with torque levels that do not require any tools and are easily obtained by most users. Using such a torque load to make a test connection with a fitting assembly in accordance with the present disclosure, we were able to obtain a sealed fluid connection that maintained a seal at fluid pressures higher than 25,000 psi before a burst or a leak.

While the present invention has been shown and described in various embodiments, those skilled in the art will appreciate from the drawings and the foregoing discussion that various changes, modifications, and variations may be made without departing from the spirit and scope of the invention as set forth in the claims. For example, the shapes, sizes, features, and materials of the fitting assembly, fluid connection, and/or analytical instrument systems of the present disclosure may be changed. Hence, the embodiments shown and described in the drawings and the above discussion are merely illustrative and do not limit the scope of the invention as defined in the claims herein. The embodiments and specific forms, materials, and the like are merely illustrative and do not limit the scope of the invention or the claims herein.

We claim:

1. A fitting assembly for a flat-bottomed port, the fitting assembly comprising:
    a tube having a second passageway therethrough and adapted to fit in the first passageway of a nut, wherein the tube has a first end and a second end, and wherein the first end of the tube has a tube seal face;
    a cylindrical transfer tube having a first end and a second end and having a third passageway therethrough, wherein the tube seal face is located within the third passageway proximal to the first end of the transfer tube, wherein the first end of the transfer tube comprises a pocket portion, and wherein the second end of the transfer tube is adapted to be secured by the nut; and
    a cylindrical ferrule in contact with the tube seal face and in fluid communication with the first passageway, wherein the ferrule is adapted to seal the first passageway when the nut is threadedly engaged in a flat-bottomed port, wherein the ferrule has a largest outer diameter, wherein a portion of the transfer tube abuts a portion of the ferrule that extends cylindrically between the tube and the pocket portion of the transfer tube, thereby applying an axial load to the ferrule, wherein the transfer tube has a largest outer diameter that is greater than the largest outer diameter of the ferrule, and wherein the ferrule is retained with an interference fit in the pocket portion of the transfer tube.

2. The fitting assembly according to claim 1, wherein the ferrule comprises a compressible material and wherein at least one of the transfer tube and an inside surface of the ferrule are adapted to provide an interference fit with the tube.

3. The fitting assembly according to claim 1, wherein the transfer tube has a shorter length than the tube and wherein the first end of the transfer tube is adapted to impinge on a portion of the ferrule, thereby forcing the ferrule against the flat-bottomed port when the nut provides an axial load.

4. The fitting assembly according to claim 1, wherein the tube comprises metal, the transfer tube comprises metal, and further wherein the pocket portion of the transfer tube is located at a terminal end thereof.

5. The fitting assembly according to claim 1 wherein the tube and the ferrule each comprise a biocompatible material.

6. The fitting assembly according to claim 1 wherein at least one of the tube and the ferrule comprises at least one of the following: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), polychlorotrifluoroethylene (PCTFE), polymer-sheathed fused silica (such as PEEKSil), fused silica, and silica borite.

7. The fitting assembly according to claim 1 wherein at least one of the tube, the transfer tube, and the ferrule comprise a material which further comprises a filler.

8. The fitting assembly according to claim 7 wherein the filler comprises fibers.

9. The fitting assembly according to claim 8 wherein the filler comprises at least one of carbon fibers, nanofibers, or metallic fibers.

10. The fitting assembly according to claim 1, wherein the ferrule has a substantially flat face adapted to seal the first passageway when pressed against the flat-bottomed port.

11. The fitting assembly according to claim 10 wherein the ferrule is adapted to seal the first passageway to a fluidic pressure of at least 15,000 pounds per square inch.

12. The fitting assembly according to claim 10 wherein the ferrule is adapted to seal the first passageway to a fluidic pressure of at least 20,000 pounds per square inch.

13. The fitting assembly according to claim 10 wherein the ferrule is adapted to seal the first passageway to a fluidic pressure of at least 25,000 pounds per square inch.

14. The fitting assembly according to claim 1 wherein the nut is adapted to engage with the flat-bottomed port in a component of an analytical instrument system, wherein the component is any one of the following: a pump, a column, a filter, a guard column, a valve, a detector, a pressure regulator, a reservoir, a degasser, a debubbler, a union, a tee, a cross, an adapter, a splitter, a sample loop, and a connector.

15. The fitting assembly according to claim 1, wherein the first end of the transfer tube extends beyond the first end of the tube.

16. A biocompatible fitting assembly for a flat-bottomed connection, the fitting assembly comprising:
    a nut having a first passageway extending therethrough and having a first end and a second end, wherein the nut is adapted to provide an axial load;
    a tube located in the first passageway and having a second passageway therethrough and having a first end extending from the first end of the nut, a portion extending through the first passageway in the nut, and a second end extending from the second end of the nut, wherein the second end of the tube further comprises a tube seal face;
    a transfer tube having a largest outer diameter, a first end, and a second end, and having a third passageway therethrough, wherein at least the first end of the transfer tube is located within the first passageway, the second end of the transfer tube is proximal the second end of the tube, wherein at least a portion of the tube is located within the third passageway and is secured relative to the transfer tube, and wherein the second end of the transfer tube has a cylindrical pocket portion defining a cylindrical pocket between the second end of the tube and the second end of the transfer tube; and
    a ferrule in contact with the tube seal face and in fluid communication with the second passageway, wherein the ferrule is adapted to seal the second passageway when the nut is threadedly engaged in a flat-bottomed port, wherein the ferrule has a largest diameter, wherein a first portion of the ferrule is located in the cylindrical pocket portion of the transfer tube, wherein an end of the first portion of the ferrule that extends between the tube and the cylindrical pocket portion of the transfer tube abuts the transfer tube, which applies an axial load to the ferrule, wherein the largest outer diameter of the transfer tube is greater than the largest outer diameter of the ferrule, and wherein the ferrule is retained in the cylindrical pocket portion of the transfer tube by an interference fit.

17. The fitting assembly according to claim 16, wherein at least one of the ferrule, the tube, and the transfer tube comprises a biocompatible material.

18. The fitting assembly according to claim 16 wherein at least one of the ferrule, the tube, and the transfer tube comprises at least one of: PEEK, PAEK, PEKK, FEP, ETFE, and PTFE.

19. The fitting assembly according to claim 16 wherein the ferrule is adapted to seal the second passageway to a fluidic pressure of at least 15,000 pounds per square inch.

20. The fitting assembly according to claim 16 wherein the nut further comprises a threaded portion operable to threadedly engage with a threaded portion of the flat-bottomed port.

21. A fitting assembly for a flat-bottomed port, the fitting assembly comprising:
    a tube having a first passageway therethrough and adapted to fit in a second passageway extending through a nut having a first end and a second end, wherein the tube has a first end and a second end;
    a transfer tube having a largest outer diameter, a first end, a second end, and a third passageway therethrough, wherein at least a portion of the tube is located within the third passageway and the first end of the tube is located proximal to the first end of the transfer tube, wherein the first end of the transfer tube comprises a pocket portion between the tube and the transfer tube, and wherein the second end of the transfer tube is adapted to be secured by the nut; and
    a ferrule having a largest outer diameter, a fourth passageway therethrough, and an interior portion, wherein the ferrule is in contact with the first end of the tube, wherein the ferrule is adapted to receive and hold the first end of the tube in the interior portion, wherein the ferrule is adapted to seal the flat-bottomed port, wherein a portion of the transfer tube abuts a portion of the ferrule that extends cylindrically between the tube and the transfer tube in the pocket portion of the transfer tube, wherein the transfer tube applies an axial load to the ferrule, wherein the largest outer diameter of the transfer tube is greater than the largest outer diameter of the ferrule, and wherein the ferrule is retained with an interference fit in the pocket portion of the transfer tube.

22. The fitting assembly according to claim 21, wherein at least one of the transfer tube and the ferrule are adapted to provide an interference fit with the tube.

23. The fitting assembly according to claim 21, wherein the transfer tube has a shorter length than the tube and wherein a portion of the transfer tube is adapted to impinge on a portion of the ferrule located in the pocket portion of the transfer tube.

24. The fitting assembly according to claim 21, wherein the ferrule comprises a metal.

25. The fitting assembly according to claim 21, wherein the ferrule has a substantially flat face adapted to seal the flat-bottomed port.

26. The fitting assembly according to claim 21, wherein the first end of the transfer tube extends beyond the first end of the tube.

* * * * *